United States Patent
Mentesh

(10) Patent No.: US 7,213,609 B2
(45) Date of Patent: May 8, 2007

(54) CONTROL SYSTEM FOR HIGH PRESSURE OIL WELLS

(75) Inventor: Ibrahim M. Mentesh, Roseville, CA (US)

(73) Assignee: Refraction Technologies Corporation, Newark, NY (US)

( * ) Notice: Subject to any disclaimer, the term of this patent is extended or adjusted under 35 U.S.C. 154(b) by 158 days.

(21) Appl. No.: 11/012,447

(22) Filed: Dec. 15, 2004

(65) Prior Publication Data

US 2006/0124881 A1 Jun. 15, 2006

(51) Int. Cl.
*F16K 5/00* (2006.01)
(52) U.S. Cl. ............... 137/375; 251/121; 251/310
(58) Field of Classification Search ........... 251/121, 251/310, 311; 137/375
See application file for complete search history.

(56) References Cited

U.S. PATENT DOCUMENTS

| | | | | |
|---|---|---|---|---|
| 868,143 | A * | 10/1907 | Strang | 251/310 |
| 2,132,199 | A | 10/1938 | Yancey | |
| 2,352,799 | A * | 7/1944 | Newton | 137/375 |
| 2,766,962 | A * | 10/1956 | Fodor et al. | 251/310 |
| 3,276,466 | A * | 10/1966 | Herbert | 137/375 |
| 4,453,567 | A * | 6/1984 | MacDonald | 137/625.17 |
| 4,735,229 | A * | 4/1988 | Lancaster | 137/375 |
| 4,791,953 | A * | 12/1988 | Berchem | 137/375 |
| 4,793,375 | A * | 12/1988 | Marty | 251/208 |
| 4,809,949 | A * | 3/1989 | Rakieski | 251/312 |
| 4,971,099 | A * | 11/1990 | Cyvas | 251/282 |
| 5,205,533 | A * | 4/1993 | Berchem | 137/375 |
| 6,367,546 | B1 | 4/2002 | Mentesh et al. | |
| 6,662,869 | B1 | 12/2003 | Mentesh et al. | |
| 2003/0155130 | A1 | 8/2003 | Mentesh et al. | |

\* cited by examiner

*Primary Examiner*—John Bastianelli
(74) *Attorney, Agent, or Firm*—Howard J. Greenwald

(57) ABSTRACT

A pressure reducing valve assembly for a high pressure oil well comprised of a hollow housing and a metering assembly disposed within such housing, such metering assembly comprising an entry liner having an entry bore, an exit liner having an exit bore, and a rotatable metering cam comprising at least one metering port that connects the entry bore to the exit bore. The metering port forms adjustable orifices with the entry bore and the exit bore, and effects the reduction of pressure within the metering assembly, thereby providing a variable choke of the fluid flow therein. The metering port is adjustable, and preferably replaceable with at least a second metering port by with a simple rotation of the metering cam.

20 Claims, 19 Drawing Sheets

CONTROL SYSTEM FOR HIGH PRESSURE OIL WELLS

FIELD OF THE INVENTION

A pressure reducer assembly for regulating high-pressure fluid flow, wherein the assembly is comprised of a rotatable adjustable choke.

BACKGROUND OF THE INVENTION

In April of 2002, U.S. Pat. No. 6,367,546 issued to the applicant of the instant case, Ibrahim M. Mentesh; the entire disclosure of this United States patent is hereby incorporated by reference into this specification. This patent described and claimed: "A pressure reducing device for a high pressure well comprising: an elongated, generally cylindrical body having an inlet end and an outlet end, said body being formed of a technical ceramic material selected from the group consisting of alumina, chromium oxide, titania, zirconia, partially stabilized zirconia, silicon nitride, silicon carbide, and combinations thereof; a flow channel formed in said body extending along a longitudinal, central axis of said body from the inlet end to the outlet end, said flow channel terminating in an outlet opening at the outlet end; an inlet opening formed in the inlet end of said body so as to be in fluid communication with said flow channel; means for securing said body in a channel of a housing such that said body does not move axially in the housing channel; and sealing means formed at the inlet end of said body for forming a liquid-tight seal between said body and the housing such that forward flowing oil is prevented from entering any space between said body and the housing." The entire disclosure of this United States patent is hereby incorporated by reference into this specification.

United States patent application publication US2003/0155130 of Mentesh et al. discloses, "A pressure reducing apparatus and a method of operating a pressure reducing apparatus are provided. The apparatus is operable to reduce the pressure and flow rate of oil being discharged from a well head to downstream processing equipment. The device has central flow channel configured to receive a flow of oil and reduce the pressure in the oil. The apparatus has internal components formed of a ceramic material that resists erosion and wear caused by sand and other debris in the oil. In one embodiment of the invention, a ceramic outer sleeve is disposed in the central flow channel and cooperates with a ceramic inner sleeve having an orifice. The ceramic inner sleeve is interchangeable with other ceramic sleeves having different orifices to modify the pressure and flow characteristics of oil as it is discharged to the downstream processing equipment." The entire disclosure of this United States patent application is hereby incorporated by reference into this specification.

The device of U.S. Pat. No. 6,367,545 has fixed flow regulation properties. When conditions change, in order to change the properties of the device of such patent, one must stop production, remove the device from the oil well, and substitute a new device.

By comparison, U.S. Pat. No. 2,132,199 of Yancey discloses a well head installation having control means (including a choke valve) so constructed as to be adaptable to different conditions and operations. The adjustable device of Yancey, however, is not very durable, unduly restricts fluid flow, and often causes undesired turbulent fluid flow.

By further comparison, the device of United States patent application publication US2003/0155130 of Mentesh et al. is adjustable only to the extent that one may manually dismantle such device an replace certain internal flow components therein with other components having different flow characteristics. This device of Mentesh et al. is not adjustable in real time, and requires downtime of the oil well in order to perform such a change of components to adjust flow.

It is an object of this invention to provide a fluid flow regulating device that is adjustable, durable, and is superior to the devices of applicant's U.S. Pat. No. 6,367,545, United States patent application publication US2003/0155130, and to the device of the Yancey patent (U.S. Pat. No. 2,132,199).

SUMMARY OF THE INVENTION

In accordance with this invention, there is provided a pressure reducing valve assembly for a high pressure oil well comprised of a hollow housing and a metering assembly disposed within such housing, such metering assembly comprising an entry liner having an entry bore, an exit liner having an exit bore, and a rotatable metering cam comprising at least one metering port that connects the entry bore to the exit bore. The metering port forms adjustable orifices with the entry bore and the exit bore, and effects the reduction of pressure within the metering assembly, thereby providing a variable choke of the fluid flow therein. The metering port is adjustable, and preferably replaceable with at least a second metering port by with a simple rotation of the metering cam.

In accordance with this invention, there is further provided a pressure reducing valve assembly comprising a hollow body comprised of a central section, an entry branch, an exit branch, and a metering cavity disposed in said central section; an entry liner disposed in an axial bore in said entry branch, said axial bore of said entry liner comprising an entry port at an inner end of said entry liner; an exit liner disposed in an axial bore in said exit branch, said axial bore of said exit liner comprising an exit port at an inner end of said exit liner; a rotatably positionable metering cam disposed in said metering cavity of said hollow body, said metering cam comprising a cylindrical body with a flat base and at least a first flow port formed in said cylindrical body of said metering cam; an inlet orifice into said first flow port of said metering cam formed at a juncture between said cylindrical body of said metering cam and said entry port at said inner end of said entry liner; and an outlet orifice out of said first flow port of said metering cam formed at a juncture between said flat base of said metering cam and a flat surface in contact with said flat base, said flat surface comprising an exit port. Said rotatably positionable metering cam is rotatably positionable between a fully closed position and a fully open position, and wherein the size of said inlet orifice is less than the size of said outlet orifice at all rotatably determined positions except said fully open position.

In accordance with this invention, there is further provided a pressure reducing valve assembly comprising a hollow body comprised of a central section, an entry branch substantially perpendicular to an exit branch, and a metering cavity disposed in said central section; an entry liner disposed in an axial bore in said entry branch, said axial bore of said entry liner comprising an entry port at an inner end of said entry liner; an exit liner disposed in an axial bore in said exit branch, said axial bore of said exit liner comprising an exit port at an inner end of said exit liner; a rotatably positionable metering cam disposed in said metering cavity of said hollow body, said metering cam comprising a cylindrical body with a flat base and at least a first flow port formed in said cylindrical body of said metering cam; an inlet orifice into said first flow port of said metering cam formed at a juncture between said cylindrical body of said metering cam and said entry port at said inner end of said entry liner; and an outlet orifice out of said first flow port of said metering cam formed at a juncture between said flat base of said metering cam and said inner end of said exit liner.

In accordance with this invention, there is further provided a pressure reducing valve assembly comprising a hollow body comprised of a central section, an entry branch substantially coaxial with an exit branch, and a metering cavity disposed in said central section; an entry liner disposed in an axial bore in said entry branch, said axial bore of said entry liner comprising an entry port at an inner end of said entry liner; an exit liner disposed in an axial bore in said exit branch, said axial bore of said exit liner comprising an exit port at an inner end of said exit liner; a rotatably positionable metering cam disposed in said metering cavity of said hollow body, said metering cam comprising a cylindrical body with a flat base and first and second flow ports formed in said cylindrical body of said metering cam; a cupped base comprised of a cylindrical body joined to a raised boss rising upwardly from a shoulder and ending at said flat upper surface, and a cup formed in said flat upper surface; an inlet orifice into said first flow port of said metering cam formed at a juncture between said cylindrical body of said metering cam and said entry port at said inner end of said entry liner; and an outlet orifice out of said first flow port of said metering cam formed at a juncture between said flat base of said metering cam and said flat upper surface of said cupped base.

BRIEF DESCRIPTION OF THE DRAWINGS

The invention will be described by reference to the following drawings, in which like numerals refer to like elements, and wherein.

Figure 1:
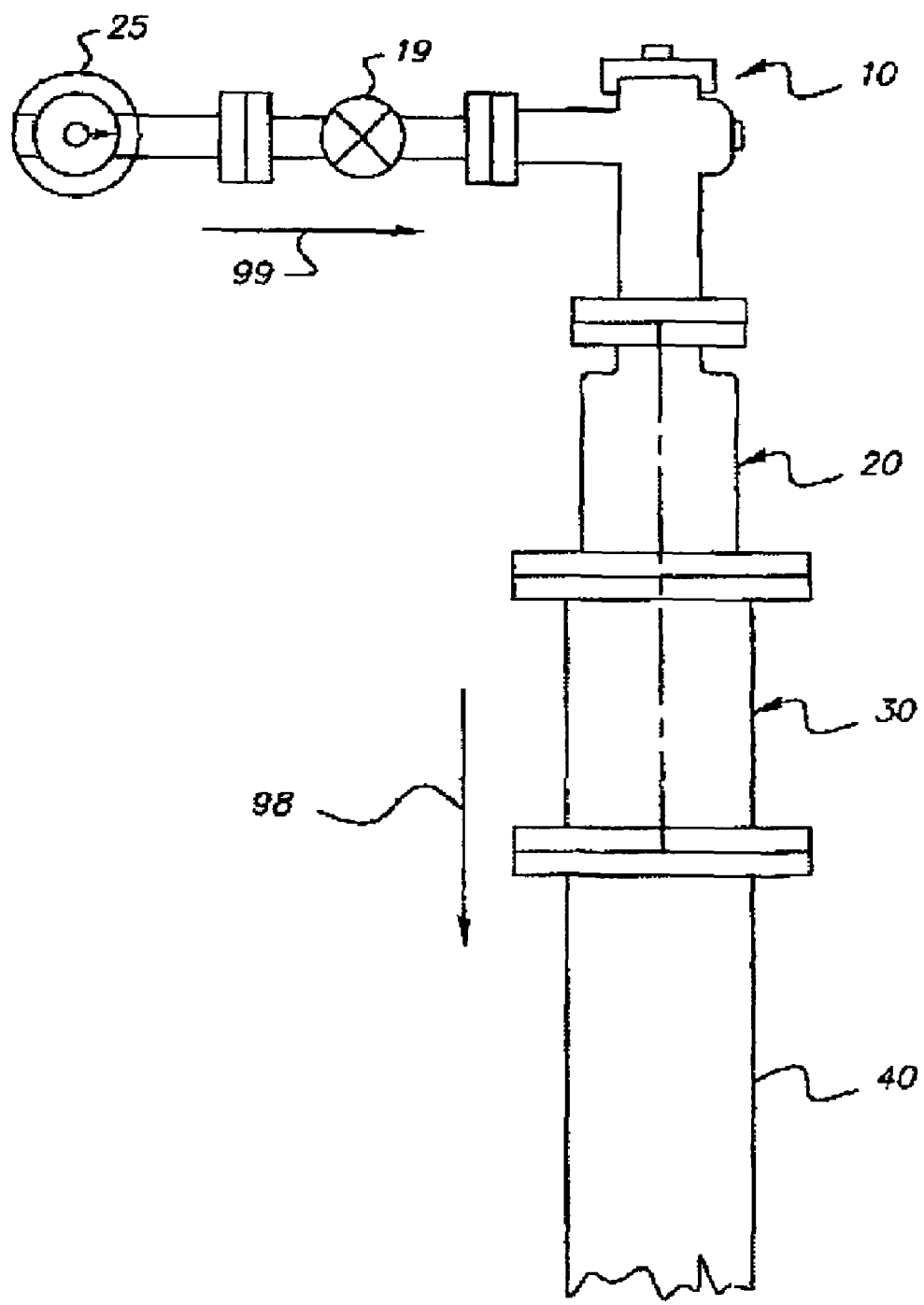
FIG. 1 is a side elevation view of a pressure reducing assembly for a high pressure oil well, similar to that of FIG. 1 of U.S. Pat. No. 6,367,546.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENTS

For a general understanding of the present invention, reference is made to the drawings. In the drawings, like reference numerals have been used throughout to designate identical elements.

FIG. 1 of this patent application is similar to FIG. 1 of U.S. Pat. No. 6,367,546; and it illustrates a pressure reducing assembly for a high pressure well head. Referring to FIG. 1, and to the embodiment depicted therein, and also to such patent, it will be seen that oil flow indicated by arrow 99 originating from the well (not shown) flows through the pressure reducing assembly and toward the oil process piping in the direction shown by arrow 98. A pressure reducing valve 10 is preferably connected through an isolation valve 19 to a well head manifold. The downstream side of pressure reducing valve 10 is connected to a first spool adapter 20, which is connected to a second spool adapter 30. The second spool adapter 30 is connected to the piping 40 that leads to the oil processing facilities (not shown).

Figure 2:
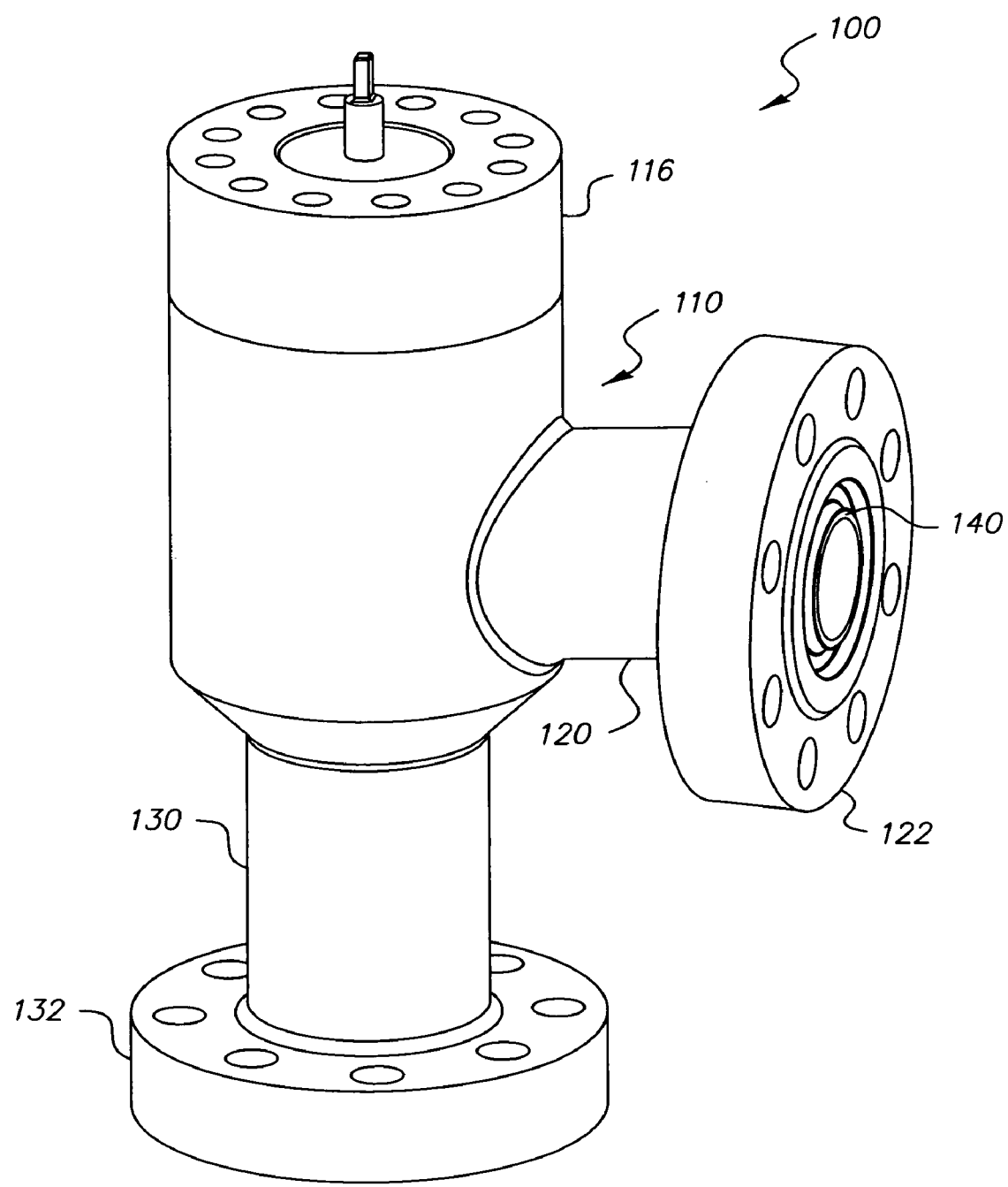
FIG. 2 is an perspective view of one pressure reducing assembly of the present invention that may be used in place of the valve 10 of FIG. 1.
Figure 3:
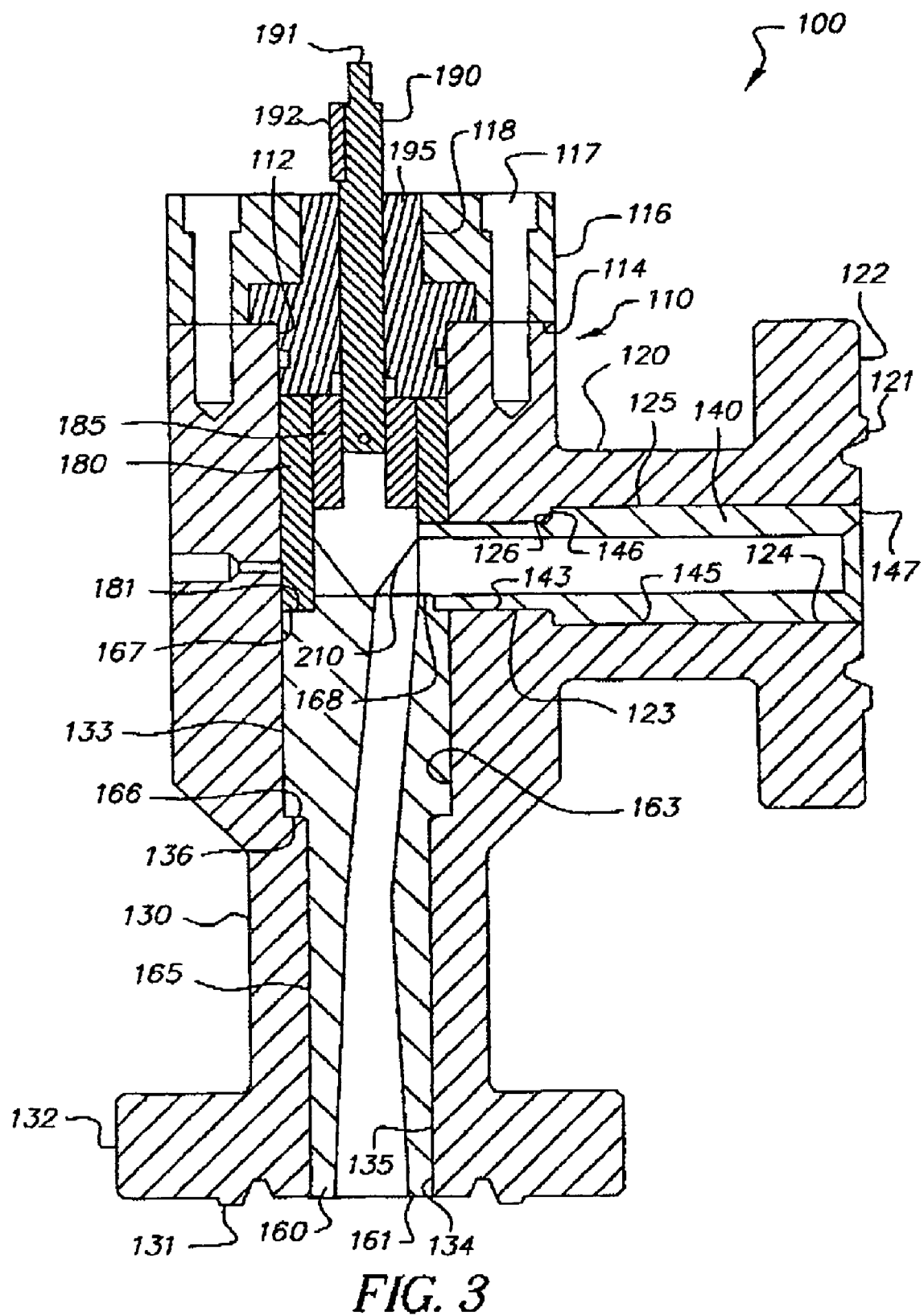
FIG. 3 is a side elevation cross-sectional view of the pressure reducing assembly of FIG. 2.
Figure 4:
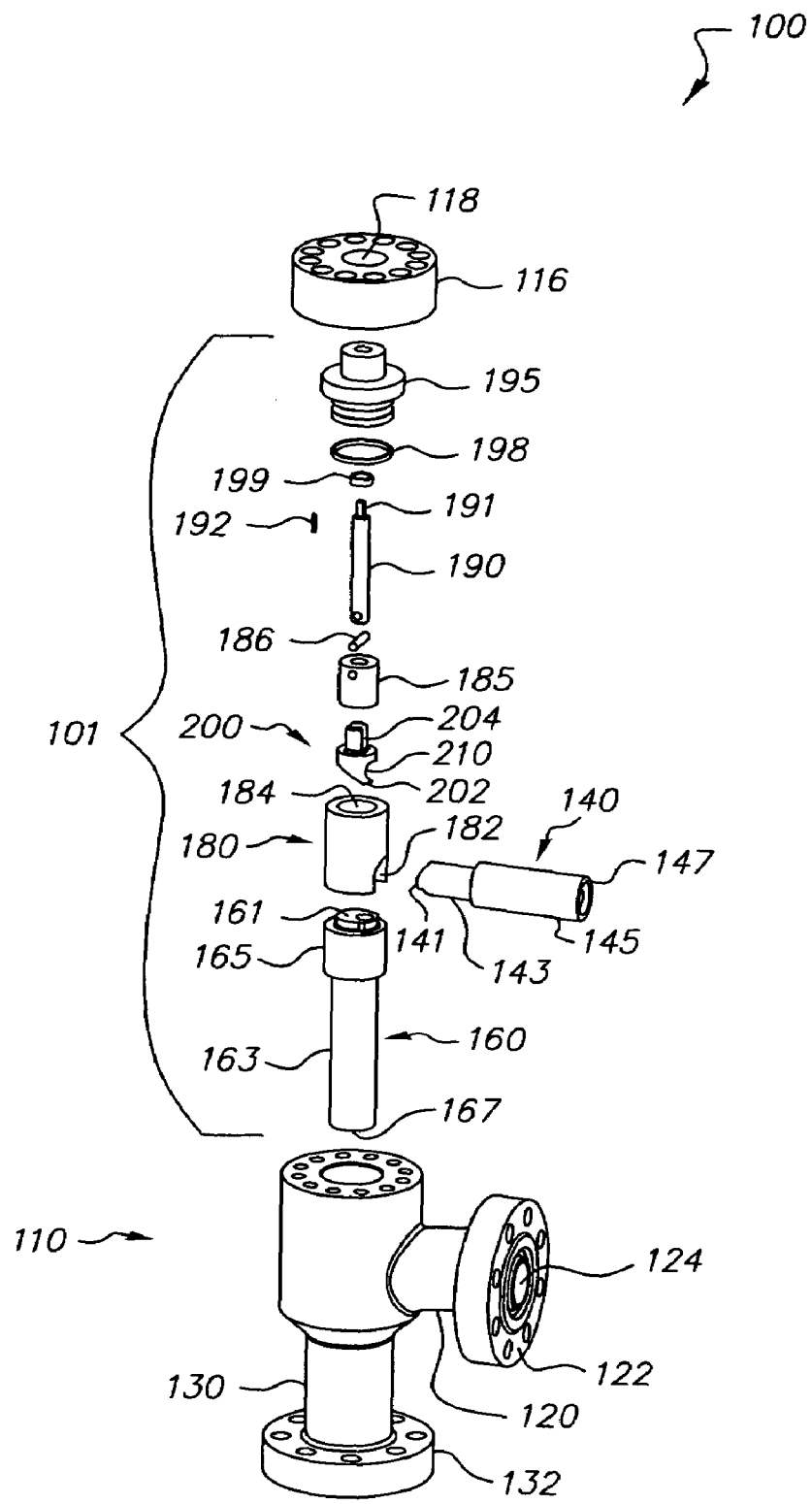
FIG. 4 is an exploded perspective view of the pressure reducing assembly of FIG. 2.

FIG. 2 is a perspective view of one pressure reducing assembly of the present invention that may be used in place of the valve 10 of FIG. 1; FIG. 3 is a side elevation cross-sectional view of the pressure reducing assembly of FIG. 2; and FIG. 4 is an exploded perspective view of the pressure reducing assembly of FIG. 2. Referring to FIGS. 2–4, and in the preferred embodiment depicted therein, it will be seen that pressure reducing assembly 100 is comprised of a hollow body 110 comprising an inlet or entry branch 120 that is substantially perpendicular to an outlet or exit branch 130. Branches 120 and 130 are provided with suitable provisions for connection to process piping, such as bolt flanges 122 and 132, respectively.

Entry branch 120 is further provided with an axial entry bore 124 disposed therein, within which is fitted inlet or entry liner 140. Entry bore 124 comprises an inner section 123 and an outer section 125, with the diameter of inner section 123 being less than the diameter of outer section 125, and the transition from inner section 123 to outer section 125 occurring at step 126. Entry liner 140 correspondingly comprises an inner section 143 and an outer section 145 transitioning at shoulder 146. The outside diameters of inner section 143 and outer section 145 may be provided to result in a mild interference fit when entry liner 140 is fitted within entry bore 124. In a preferred embodiment, entry liner 140 is secured within entry bore by the use of a suitable adhesive, such as e.g., epoxy or silicone adhesive. The length of outer section 145 is provided such that the outer end 147 of entry liner 140 is coplanar with sealing face 121 of flange 122 when shoulder 146 is in contact with step 126 of bore 120. The length of inner section 143 is provided such that the inner end 141 of entry liner 140 is precisely positioned within metering cavity with respect to other internal components of valve 100 when shoulder 146 is in contact with step 126. The details of the spatial relationships of inner end 141 of entry liner 140 and the other internal components of valve 100 will be explained subsequently in this specification.

Exit branch 130 is further provided with an axial exit bore 134 disposed therein, within which is fitted outlet or exit liner 160. Exit bore 134 comprises an inner section 133 and an outer section 135, with the diameter of inner section 133 being less than the diameter of outer section 135, and the transition from inner section 133 to outer section 135 occurring at step 136. Exit liner 160 correspondingly comprises an inner section 163 and an outer section 165 transitioning at shoulder 166. The outside diameters of inner section 163 and outer section 165 may also be provided to result in a mild interference fit (as may be done for entry liner 140) when exit liner 160 is fitted within exit bore 134. In a preferred embodiment, exit liner 160 is secured within entry bore by the use of a suitable adhesive, such as e.g., epoxy or silicone adhesive. The length of outer section 165 is provided such that the outer end 167 of exit liner 160 is coplanar with sealing face 131 of flange 132 when shoulder 166 is in contact with step 136 of bore 130. The length of inner section 163 is provided such that the inner end 161 of exit liner 160 is precisely positioned within metering cavity with respect to other internal components of valve 100 when shoulder 166 is in contact with step 136. The details of the spatial relationships of inner end 161 of exit liner 160 and the other internal components of valve 100 will be explained subsequently in this specification.

Referring again to FIG. 3 and FIG. 4, pressure reducing valve assembly 100 comprises numerous additional components disposed within metering bore 112 of valve body 110, for the purpose of providing real-time adjustability of the pressure reduction provided by assembly 100. Such components include body sleeve 180, metering cam 200, connector 185, shaft 190, shaft and seal guide 195, fire safe body seal 198, and fire safe shaft seal 199; such components, together with entry liner 120 and exit liner 130 comprise an overall internal metering assembly 101 disposed within valve assembly 100.

Figure 5:
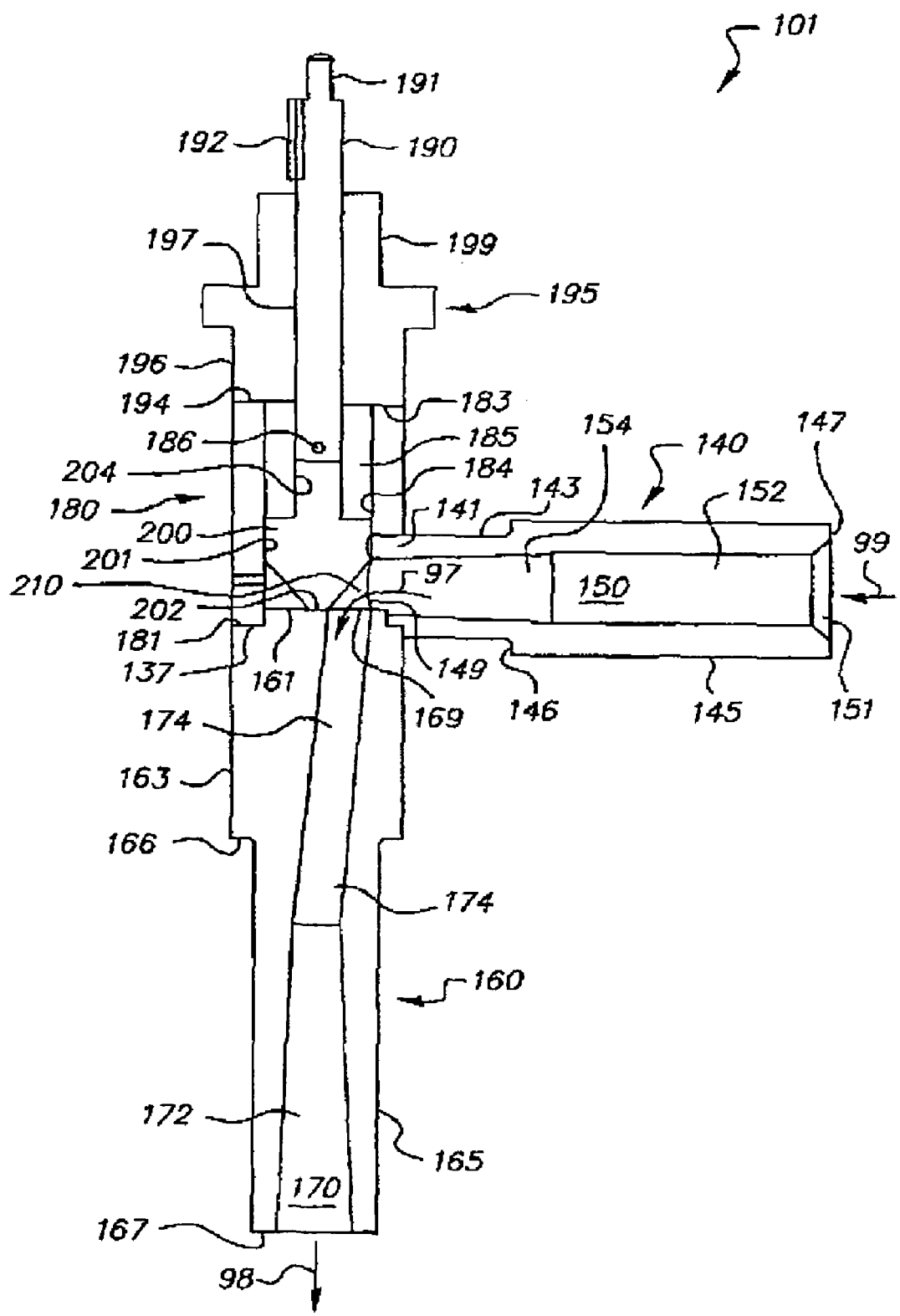
FIG. 5 is a cross-sectional elevation view of an internal metering assembly of the pressure reducing assembly of FIG. 2, viewed from the same vantage point as for FIG. 3.

The spatial and cooperative relationships between the components of metering assembly 101, and the manner in which metering assembly 101 is assembled are best understood with reference also to FIG. 5, which is a cross-sectional elevation view of metering assembly 101, viewed from the same vantage point as for FIG. 3. For the sake of simplicity of illustration, certain components such as fire seals 198 and 199 are not depicted in FIG. 5.

Referring to FIGS. 3, 4, and 5, exit liner 130 is disposed in metering bore 112 and pushed downwardly until shoulder 166 of exit liner 160 is stopped by step 136 in exit bore 134 of housing 110. Annular body sleeve 180 is then fitted into metering bore 112, until the lower end 181 thereof is seated upon upper shoulder 167 of exit liner 160. Annular body sleeve 180 is further provided with a U-shaped opening 182 in the lower end thereof, such that when body sleeve 180 is seated in metering bore 112, U-shaped opening 182 and the upper end 168 of exit liner 160 form a port for receiving inner end 141 of entry liner 140.

Entry liner 140 is thus inserted into entry bore 124 of body 110 until shoulder 146 of entry liner 140 is seated against shoulder 126 of entry bore 124. Inner end 141 of entry liner 140 is precision machined so as to match and seal with the corresponding contours of U-shaped opening 182 of body sleeve 180 and upper end 168 of exit liner 160, and to permit sliding contact with the vertical wall 201 of metering cam 200 when metering cam 200 is rotated.

Metering cam is 200 is disposed within the inner bore 184 of body sleeve 180, such that the flat base 202 of metering cam 200 is in contact with the flat upper end 161 of exit liner 160. The vertical wall 201 of metering cam 200 is substantially cylindrical, and has a diameter with just sufficient clearance with inner bore 184 of body sleeve 180 such that metering cam is slidable and rotatable within bore 184.

Metering cam 200 is operatively connected to shaft 190, such that rotation of shaft 190 by suitable rotational drive means (not shown) results in the rotation of metering cam 200. Metering cam 200 is provided with at least one flow port 210 machined or otherwise formed therein, so that when metering cam 200 is placed in various rotational positions, various amounts of fluid flow and pressure reduction will occur within valve assembly 100. The details of such flow and pressure reduction will be described subsequently in this specification.

In the embodiment depicted in FIGS. 3–5, shaft 190 is operatively connected to metering cam 200 by shaft connector 185. Metering cam 200 is provided with an upper drive stub 204 that is square, and that engages with a corresponding square bore portion of connector 185. A pin 186 passes through small cross-bores provided in shaft 190 and shaft connector 185. Alternatively, numerous other means for coupling the rotation of two adjacent shafts may be used to connect cam 200 and shaft 190; such means will be readily apparent to those skilled in the art.

The position of cam drive shaft 190 is maintained coaxial with respect to axial bore 112 by shaft and seal guide 195, the lower portion 196 of which is slidingly engaged within axial bore 112 of valve body 110. Shaft 190 is disposed within axial bore 197 of guide 195. Shaft and seal guide 195 is further provided with a flange 198 which is in contact with upper surface 114 of valve body 110. Guide 195 is dimensioned such that the lower surface 194 thereof is also in contact with the upper surface 183 of body sleeve 180.

The entire metering assembly 101 is held in place within valve body 110 by cap 116, which is secured to surface 114 of body 110 by suitable fastening means, such as e.g. socket head cap screws 119 (see FIG. 6) countersunk into recessed cavities 117 in cap 116. Upper end 199 of shaft and seal guide 195 is precisely positioned by the provision of a correspondingly shaped stepped bore 118 in cap 116.

Drive shaft 190 and metering cam 200 may be rotationally driven and positioned by provision of suitable drive means (not shown) operatively connected to suitable features on shaft 190, such as square stub 191 and/or key 192. Such drive means may be manually operated, e.g. a hand wheel and gear box attached to shaft 190. Alternatively, such drive means may be an automatic and remotely controlled valve actuator. Such valve actuator is provided with at least 90 degrees of rotational displacement, preferably at least about 180 degrees of rotational displacement for operating metering cam 200. In one embodiment, a Model V Series valve positioner is used, manufactured by the Valve Related Controls Corporation of Loveland Ohio.

For applications involving the transport of crude oil with entrained sand, or the transport of other abrasive two-phase mixtures, the components of metering assembly 101 of valve assembly 100 are made of materials that are highly resistant to wear, so as to resist the wearing effect that occurs from such entrained sand conveyed by the high pressure oil flowing within valve assembly 100. As recited previously, such components include body sleeve 180, metering cam 200, connector 185, shaft 190, shaft and seal guide 195, entry liner 120 and exit liner 130. In one preferred embodiment, these components are made from a technical ceramic, as that term is defined in U.S. Pat. No. 6,367,546; the entire disclosure of this U.S. patent is hereby incorporated by reference into this specification. Thus, and referring to Column 6 of U.S. Pat. No. 6,367,546, " . . . the ceramic material is selected from the class of technical ceramics, particularly technical ceramic materials that exhibit superior wear resistance and strength. Among the preferred ceramic materials are aluminum oxide (alumina), chromium oxide (chromia), high alumina, titanium oxide (titania), zirconium oxide (zirconia) ceramics, including fully and partially stabilized zirconia, and combinations of such metal oxides. It is believed that just about any type of metal-oxide ceramic will provide acceptable properties. Excellent results have been achieved using partially stabilized zirconia (PSZ) for making the aforesaid components. Particular species of PSZ that are believed to be useful for the aforesaid components include Mg-PSZ and yttria PSZ. Silicon nitride, quartz, silicon carbide, and tungsten carbide ceramics are also expected to be useful in such components."

When transporting an abrasive two-phase mixture such as crude oil with entrained sand, the selection of material for metering cam 200 is particularly important, since metering cam must withstand the highly abrasive local flow field that occur therein in order to effect the momentum change and pressure reduction in the transition (indicated by arcuate arrow 97) from inlet flow 99 to outlet flow 98. In one embodiment, the preferred ceramic material used to make metering cam 200 is stabilized zirconia ceramic material. In one aspect of this embodiment, magnesia partially stabilized zirconia is preferred.

For other applications, such as the transport of a "sweeter" and "cleaner" crude oil that does not contain entrained sand and/or acidic species such as hydrogen sulfide or carbon dioxide, or caustic species, or such as other fluids handled in various chemical processing applications, the use of technical ceramics in the components of metering assembly 101 may not be necessary. Such less degradative fluids may be satisfactorily transported using a pressure reducing valve assembly of the present invention that is comprised of mostly metal components. Such metal components may be made of other high performance metal alloys used in valves, such as e.g., 4130 alloy steel, stainless steel, Hastelloy®, and the like.

For any of these embodiments of the applicant's pressure reducing valve assemblies, the components of metering assembly 101 thereof are provided with certain internal porting and flow geometry. Without wishing to be bound to any particular theory, applicant believes that the internal porting and flow geometry of the metering assembly 101 of his valve confines the most severe turbulence within the flow port of metering cam 200, and also reduces overall flow turbulence within metering assembly 101. The applicant believes that such a confinement of turbulence causes the wear within metering assembly 101 that is due to the tendency of sand to be centrifugally displaced outwardly in flow eddies to occur to a greater degree within the flow port of metering cam 200. The flow and pressure reduction within metering cam 200 is adjustable to compensate for such wear, and is renewable at least once by rotation of the valve to put a second flow port in service as will be explained subsequently. In addition, the applicant believes that such a reduction in turbulence and more "straightened" flow reduces the tendency of sand to be centrifugally displaced outwardly in flow eddies and thus abrade local wall areas within metering assembly 101. Accordingly, the wearing effect that occurs from entrained sand conveyed by the high pressure oil flowing within valve assembly 100 is further reduced.

Figure 6:
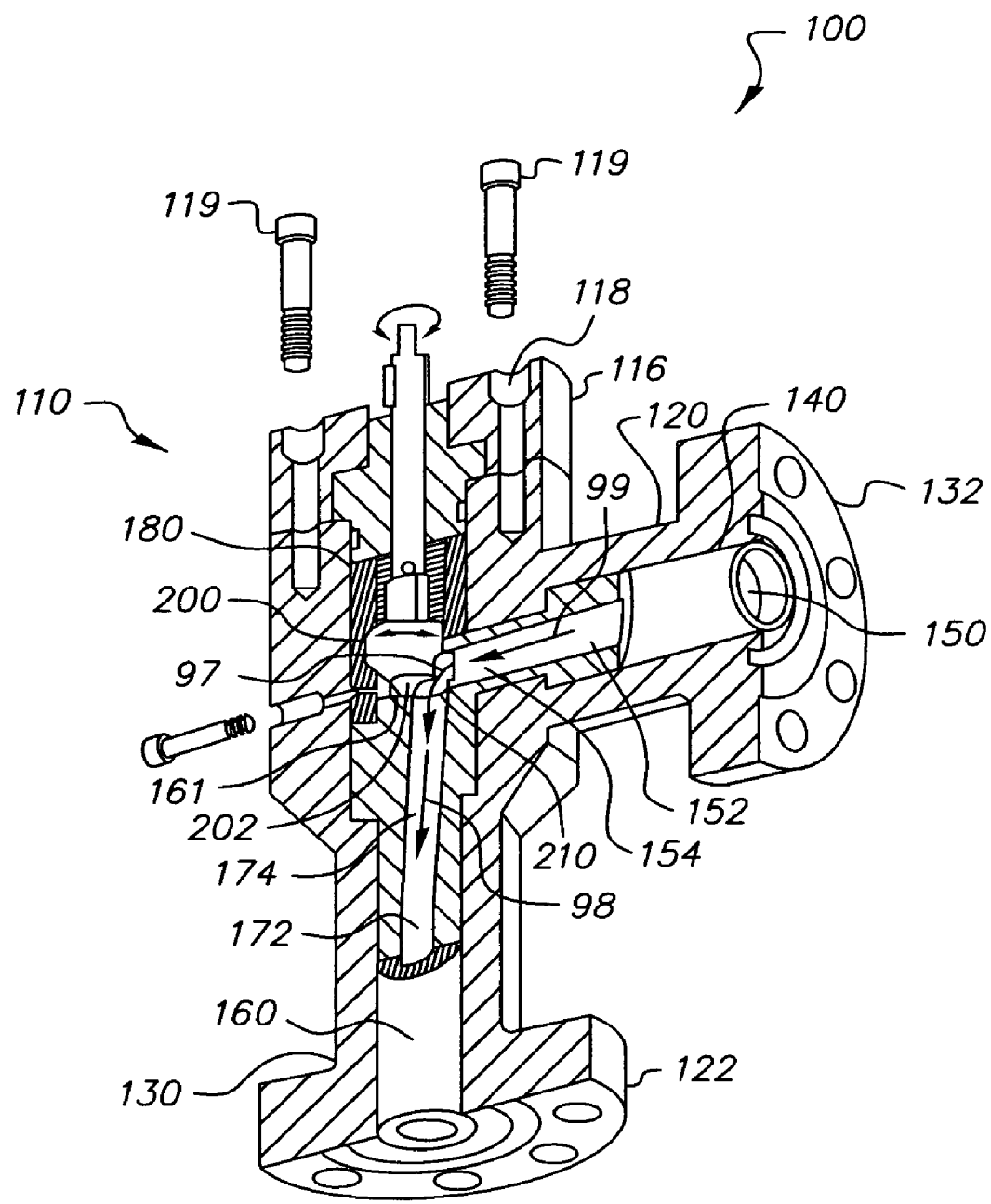
FIG. 6 is a cutaway perspective view of the pressure reducing assembly of FIG. 2, taken from an angle that is slightly beneath and to the right of the orthogonal viewpoint of the side elevation view of FIG. 2.

One preferred porting arrangement and flow path within the components of metering assembly 101 is best understood with reference also to FIG. 6, which is a cutaway perspective view of the pressure reducing assembly of FIG. 2, taken from an angle that is slightly beneath and to the right of the orthogonal viewpoint of the side elevation view of FIG. 2. Referring to FIGS. 5 and 6, entry liner 140 comprises an inlet or entry bore 150 that begins at outer end 147 with an optional inlet reducing flare 151, continues inwardly through constant diameter bore 152, and reducing tapered bore 154, terminating at inner end 141. Inner end 141 of entry liner 140 is disposed within a port formed by the U-shaped cavity 182 of body sleeve 180 and inner end 161 of exit liner 160, as described previously.

Tapered bore 154 is provided to narrow the inlet flow stream 98 in order to begin the pressure reduction of flow stream 98 without inducing turbulence, and in particular, to provide a smaller flow path that may be more smoothly matched to the flow path through and past metering cam 200 at such time when metering cam 200 is rotationally positioned to permit flow and pressure reduction therethrough.

In FIG. 5 and FIG. 6, it will be apparent that metering cam 200 is positioned to permit flow therethrough as indicated by arcuate arrow 97. The volumetric rate of flow, and the pressure reduction within valve 100 is dependent upon the relative rotational position of metering cam 200 within body sleeve 180. This rotational position determines the extent to which an open orifice is provided at the inner end 141 of entry liner 140 for fluid flow to enter into flow port 210 of metering cam 200, and the extent to which an open orifice is provided at the inner end 168 of exit liner 160 for fluid flow to exit from flow port 210 of metering cam 200 into bore 170 of exit liner 160. The dimensional details of one embodiment of metering cam 200, and the resulting dependence of valve opening upon rotational position will be described subsequently in this specification.

Referring again to FIG. 5 and FIG. 6, exit liner 160 comprises outlet or exit bore 170 that begins at inner end 161 thereof with angled bore 174 and continues outwardly through expanding tapered bore 172. Tapered bore 172 is provided to expand the outlet flow stream 98 in order to reduce the velocity of flow stream 98 without inducing turbulence and to provide a larger flow path that may be more smoothly matched to the cross section of downstream process piping (not shown). Angled bore 174 is provided to match the location of entry port 169 thereof with the general location of the flow port 210 of metering cam 200, when such metering cam 200 is positioned to permit flow through metering valve 100. The port 210 of metering cam 200 is specifically located off-center in the vertical wall 201 and the flat base 202 thereof for reasons to be explained presently. The angling or biasing of angled bore 174 has the added advantage of reducing the amount of momentum change of the fluid flow 97 that must be done within port 210 of metering cam. A small amount of momentum change is deferred to occur in the angular transition from angled bore 174 to expanding tapered bore 172. Such a feature reduces turbulence and associated abrasive wear within valve 100.

Dimensional details of components of one preferred metering assembly 101 of the applicant's pressure reducing valve 100 will now be described, with it being understood that such components are preferably made of the technical ceramic materials described previously herein. Referring again to FIG. 5 and FIG. 6, and in one preferred embodiment depicted therein, entry liner 140 is formed with an outside diameter of outer section 145 of about 2.04 inches; an outside diameter of inner section 143 of about 1.75 inches; a 45 degree inlet flare 151 tapering from about 1.50 inches to constant diameter bore 152 of about 1.00 inches; and a tapered bore 154 reducing from 1.00 inches to about 0.75 inches at exit port 149. Constant diameter bore 152 is about 4.54 inches in length, and reducing tapered bore 154 is about 2.85 inches in length.

Exit liner 160 is formed with an outside diameter of outer section 165 of about 2.04 inches; an outside diameter of inner section 163 of about 2.80 inches; an expanding tapered bore 172 of about 0.75 inches in diameter at its juncture with angled bore 174, and expanding to about 1.25 inches in diameter at outer end 167, and with a taper of about 5 degrees; and an angled bore 174 of about 0.75 inches in diameter, angled at about 6 degrees with respect to the central axis of exit liner 160. Tapered bore 172 is about 5.72 inches in length, and angled bore 174 is about 4.41 inches in length with respect to the central axis of liner 160.

Referring again to FIG. 5 and FIG. 6, when a fluid, particularly a crude oil with entrained sand, is flowing through reducing valve 100, the inlet fluid flow indicated by arrow 99 is at a high pressure, and the outlet fluid flow indicated by arrow 98 is at a significantly reduced pressure. The majority of the change in momentum of the inlet flow (such momentum being in the direction of arrow 99), to the momentum of the outlet flow (such momentum being in the direction of arrow 98), occurs within and near the port 210 of metering cam 200, in the flow region indicated by arcuate arrow 97. The majority of the pressure reduction within valve 100 likewise occurs in this flow region, in particular through the orifice formed at the inner end 141 of entry liner 140 and the flow port 210 of metering cam 200, and the open orifice formed at the inner end 168 of exit liner 160 and the flow port 210 of metering cam 200.

Thus, most of the fluid acceleration (and associated turbulence) to effect the momentum change and pressure reduction of the fluid within the valve occurs at these orifices, and within flow port 210 of metering cam 200. The applicant's pressure reducing valve comprises a uniquely dimensioned metering cam 200 with porting that minimizes such acceleration and turbulence, and that thus minimizes wear due to sand entrained within such fluid. To the extent that such abrasive entrained sand is centrifugally forced outwardly due to turbulent eddies in the flow field, thereby impinging on the surface of the metering cam 200 and liners 140 and 160, in the preferred embodiment such components are made of technical ceramics previously described herein that are highly resistant to such abrasion. To the extent that the flow port 210 of metering cam 200 does wear to the point of rendering valve 100 unsuitable as a pressure reducing device, in the preferred embodiment metering cam 200 is provided with at least a second flow port, such that a simple angular rotation of metering cam 200 takes the worn flow port 210 thereof out of service, and replaces it with a fresh unworn flow port to enable continued operation. Such a change may be done with the oil flow from the wellhead (not shown) uninterrupted, and with no associated downtime and related lost production.

Figure 7A:
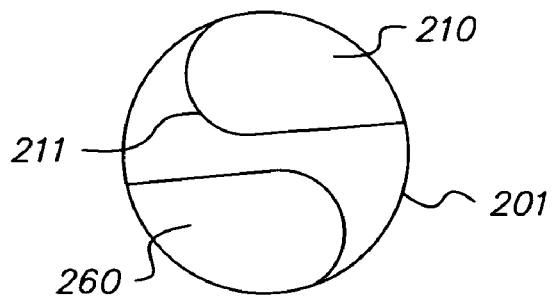
FIG. 7A is a bottom view of one preferred embodiment of a valve metering cam, taken along the central axis of an exit liner of the pressure reducing assembly of FIG. 2.
Figure 7B:
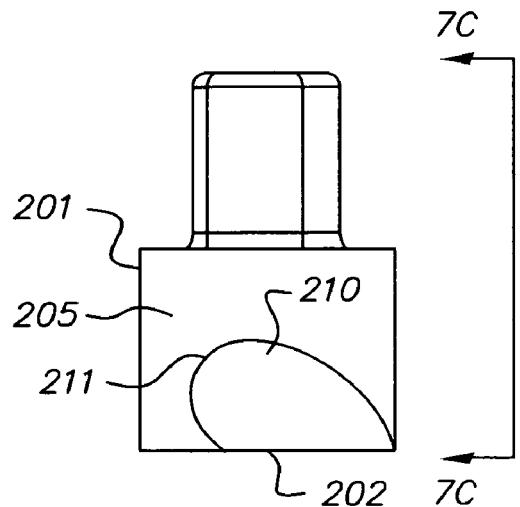
FIG. 7B is a first side elevation view of a metering cam of the pressure reducing assembly of FIG. 2.
Figure 7C:
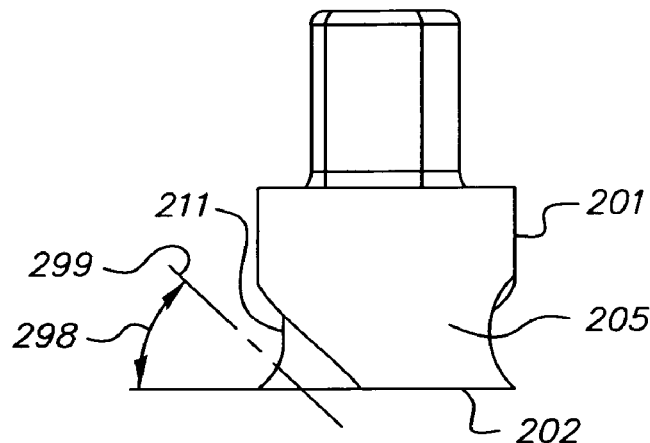
FIG. 7C is a second side elevation view of the metering cam orthogonal to the view of FIG. 7B, taken along line 7C—7C of FIG. 7B.
Figure 7D:
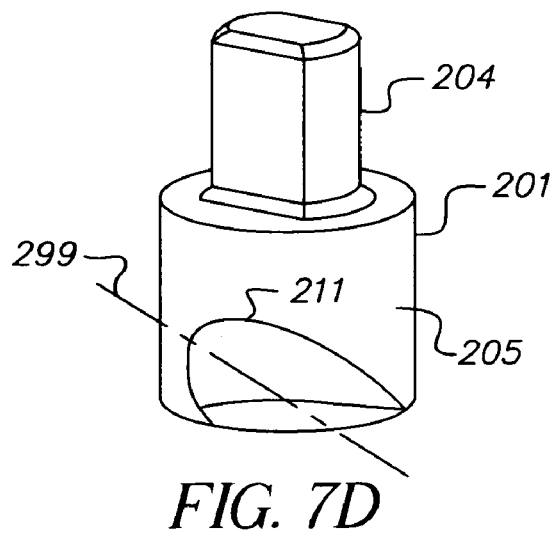
FIG. 7D is a perspective view of the metering cam of FIG. 7A.

The preferred geometry of metering cam 200 is best understood with reference to FIGS. 7A–7D. FIG. 7A is a bottom view of one preferred embodiment of metering cam 200, taken along the central axis of exit liner 160 of metering valve 100; FIG. 7B is a first side elevation view of metering cam 200; FIG. 7C is a second side elevation view of metering cam 200 orthogonal to the view of FIG. 7B, taken along line 7C—7C of FIG. 7B; and FIG. 7D is a perspective view of the metering cam 200 of FIG. 7A.

Referring to FIGS. 7A–7D, metering cam 200 is comprised of a cylindrical body 205 defined by vertical wall 201, a drive stub 204 extending upwardly from vertical wall 201, and a flat base 202 perpendicular to vertical wall 201. Metering cam 200 further comprises at least one flow port 210 machined or otherwise formed therein, so that when the rotational position of metering cam 200 is varied, the amount of fluid flow and pressure reduction within valve assembly 100 is correspondingly varied. In the preferred embodiment depicted in FIGS. 7A–7D, metering cam 200 comprises a first flow port 210 and a second flow port 260. Flow ports 210 and 260 are preferably dimensionally mirror images of each other, and are formed in cylindrical body 205 in locations that are 180 degrees opposite of each other. In the following description, only first flow port 210 will be described in detail, with it being understood that the geometry of second flow port 260 is substantially the same as first flow port 210.

In the preferred embodiment of metering cam 200 depicted in FIGS. 7A–7D, flow port 210 comprises a cylindrical cavity cut into the side of vertical wall 201, with the central axis 299 of the cavity being at an acute angle 298 with respect to the plane defined by flat base 202 of metering cam 200. In one method of fabrication, flow port 210 is formed by placing an unported metering cam 200 in a machine tool fixture, and applying a cylindrical cutting bit against the vertical wall 201 of cylindrical body 205 of metering cam 200. Such cutting bit is oriented with its rotational axis 299 at the angle 298 of FIG. 7C with respect to the flat base 202 of metering cam 200. The tool bit (not shown) preferably has a diameter that is between about 0.30 and 0.45 times the diameter of the cylindrical body 205 of metering cam 200, and more preferably between about 0.4 and 0.45 times the diameter of the cylindrical body 205 of metering cam 200. The angle 298 of cutting with respect to flat base 202 is preferably between about 30 and about 50 degrees, and more preferably between about 35 and about 45 degrees. Such cutting tool is made to cut into the vertical wall 201 of cylindrical body 205 to a depth about equal to the diameter of the cutting tool.

It will be apparent that numerous other machining and forming methods may be used to provide one or more flow ports 210/260 within metering cam 200 that are of substantially the same shape.

By virtue of the geometry of metering cam 200, and in particular, the geometry of flow port 210 formed therein, in a certain rotational position, or short range of positions, fluid flow will be permitted. In another range of rotational positions of metering cam 200, a varying amount of pressure reduction and rate of fluid flow will occur, from complete pressure reduction to zero at zero flow, to a minimum amount of pressure reduction and a maximum rate of flow. This variation in pressure reduction and rate of fluid flow corresponds to the extent of opening of the orifice formed at the junction of the inner end 141 of entry liner 140 and the flow port 210 of metering cam 200, and the extent of opening of the orifice formed at the junction of inner end 168 of exit liner 160 and the flow port 210 of metering cam 200.

Figure 8:
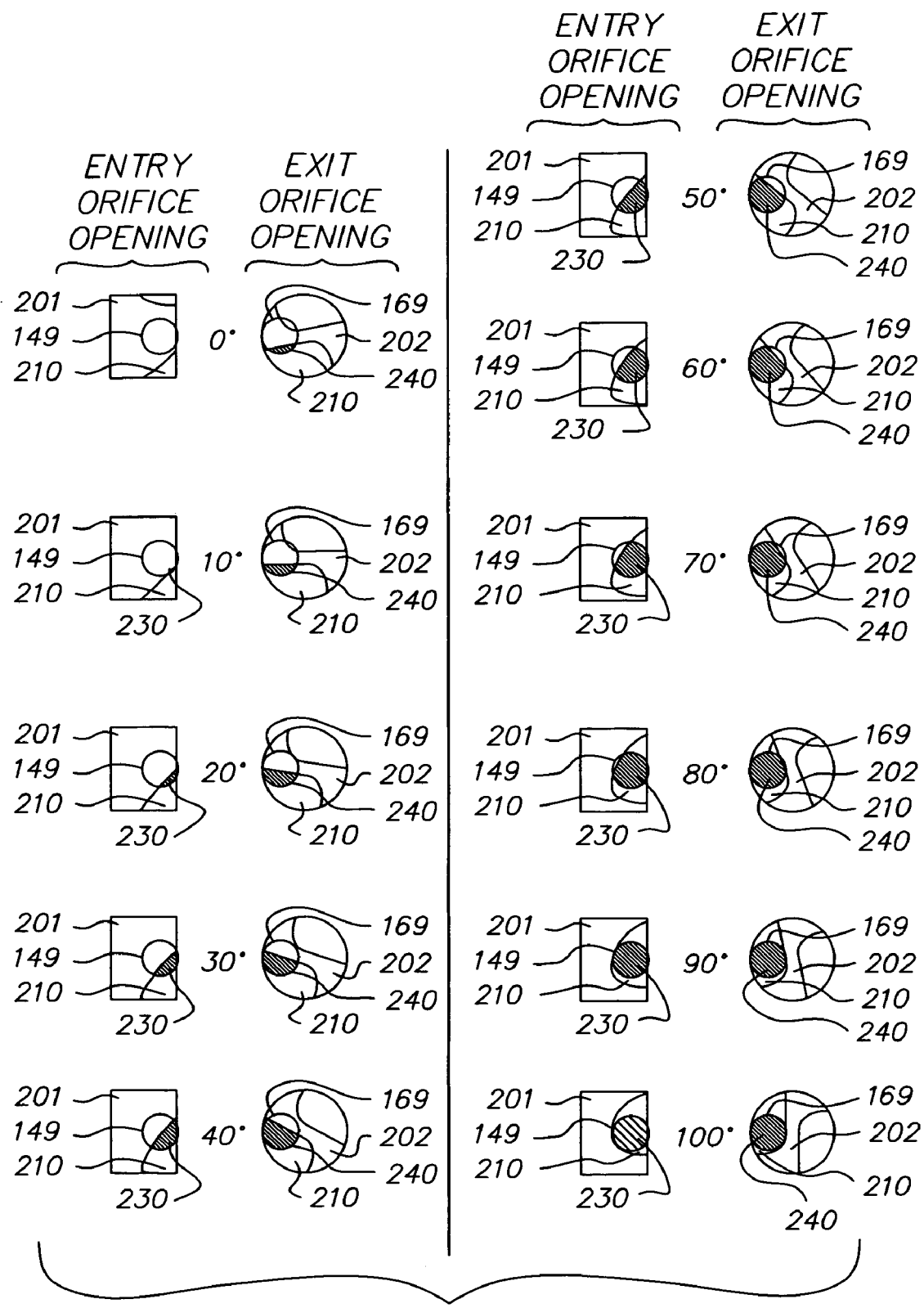
FIG. 8 is a schematic representation of the relative extent of opening of two orifices that are formed at the junction of the entry liner and the metering cam, and the junction of the exit liner and the metering cam of the metering valve.

FIG. 8 is a schematic representation of the relative extent of opening of the two orifices that are formed at the junction of the inner end 141 of entry liner 140 and the flow port 210 of metering cam 200, and the junction of inner end 168 of exit liner 160 and the flow port 210 of metering cam 200. Referring to FIG. 8, the entry orifice opening 230 is seen by depicting a planar projection of the junction of vertical cylindrical wall 201 and flow port 210 of metering cam 200 with port 149 of entry liner 140. The exit orifice opening 240 is seen by depicting the junction of flat base 202 and flow port 210 of metering cam 200 with port 169 of exit liner 160.

It can be seen that at 0 degrees of metering cam rotation and valve opening, that some degree of opening is provided at exit orifice 240, but that no opening of entry orifice 230 occurs. Thus, there is no flow through choke valve 100 at 0 degrees opening, and total pressure reduction to zero downstream of valve 100. At a slight metering cam rotation of 10 degrees, it can be seen that entry orifice 230 just begins to open to permit some flow, with a high degree of pressure reduction. Exit orifice 240 is open considerably more at 10 degrees of metering cam rotation.

FIG. 8 depicts the progressive extent of entry orifice opening 230 and exit orifice opening 240 in 10 degree increments through 100 degrees of metering cam rotation. It can be seen that at 80 degrees of metering cam rotation, exit orifice 240 is nearly completely open, and entry orifice 230 is also very substantially open, having nearly "caught up" with exit orifice 240 in the amount of opening. Subsequently, at 90 degrees and 100 degrees of cam rotation, orifices 230 and 240 are both substantially 100 percent open.

Figure 9:
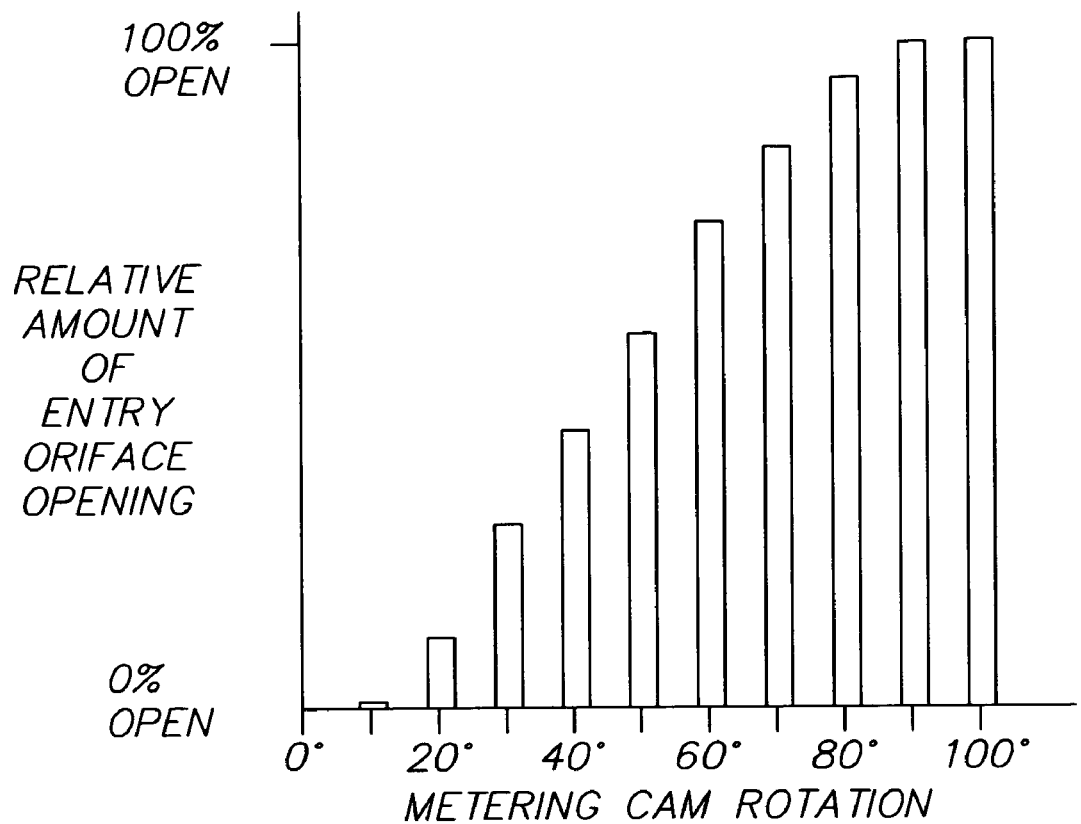
FIG. 9 is a bar graph of the relative amount of opening of an entry orifice formed at the junction of the entry liner and the metering cam as a function of metering cam rotation.

Table 1 summarizes the relative amount of opening for entry orifice 230 and exit orifice 240 versus the amount of metering cam rotation for one preferred embodiment of the metering valve 100 and metering assembly 101 of FIGS. 2–8. FIG. 9 is a bar graph of the relative amount of opening of entry orifice 230 as a function of metering cam rotation.

TABLE 1

DEPENDENCE OF ENTRY AND EXIT ORIFICE OPENINGS UPON THE EXTENT OF METERING CAM ROTATION FOR A PREFERRED PRESSURE REDUCING VALVE.

| | CAM ROTATION | | | | | | | | | | |
|---|---|---|---|---|---|---|---|---|---|---|---|
| | 0° | 10° | 20° | 30° | 40° | 50° | 60° | 70° | 80° | 90° | 100° |
| ENTRY ORIFICE OPENING, % | 0.0 | 1.0 | 10.6 | 27.6 | 41.6 | 56.1 | 72.8 | 84.1 | 94.5 | 99.7 | 100 |
| ENTRY ORIFICE OPENING, SQ. IN | 0.000 | 0.004 | 0.046 | 0.120 | 0.181 | 0.244 | 0.317 | 0.366 | 0.411 | 0.434 | 0.435 |
| EXIT ORIFICE OPENING, % | 13.4 | 26.1 | 40.2 | 54.5 | 68.2 | 79.5 | 88.2 | 94.3 | 97.9 | 99.5 | 100 |
| EXIT ORIFICE OPENING, SQ. IN | 0.059 | 0.115 | 0.177 | 0.240 | 0.300 | 0.350 | 0.388 | 0.415 | 0.431 | 0.438 | 0.440 |

Referring to Table 1 and FIG. 9, it can be seen that the relative amount of opening of entry orifice 230 is always less than the relative amount of opening of exit orifice 240, except at full opening of about 90 to 100 degrees of metering cam rotation. In particular, it can be seen that the relative amount of opening of entry orifice 230 is significantly less than the relative amount of opening of exit orifice 240 in the range of 0 degrees to 70 degrees, and especially so in the range of 0 degrees to about 50 degrees of metering cam rotation.

Because of this difference, the major share of the pressure reduction in pressure reducing valve 100 occurs at entry orifice 230, rather than at exit orifice 240. To the extent that turbulence occurs in the flow field within metering assembly 101 of valve 100, the applicant believes that the greatest degree of turbulence occurs immediately downstream from entry orifice 230. Accordingly, the greatest degree of wear due to the tendency of sand to be centrifugally displaced outwardly in flow eddies occurs to the greatest degree within the flow port 210 of metering cam 200.

By configuring the flow metering port 210 of inlet cam 200, the inner port 149 of entry liner 140, and the inner port of exit liner 160, the applicant can cause the greatest portion of the wear within his pressure reducing valve to occur within the metering port 210 of metering cam 200, rather than within the bores 150 and 170 of entry liner 140 and exit liner 160, respectively. This is a highly advantageous feature for several reasons:

1. Because the position of metering cam 200 is adjustable in real time, to the extent that wear occurs on the surface of metering port 210 of metering cam 200, the position of metering cam 200 can be adjusted to compensate for such wear, and to maintain constant pressure reducing performance by valve 100 for a considerable period of time in operation. The adjustment of such position can be done by automatic closed loop control, with the fitting of a proper valve actuator on valve 100, and proper flow and/or pressure sensors in the process piping.
2. At the point in time where the flow port 210 of metering cam 200 has worn to the degree that it is no longer serviceable, metering cam is simply rotated 180 degrees, and the second flow port 260 is placed in service with no interruption in oil well production.
3. At such time as both ports 210 and 260 on metering cam 200 are sufficiently worn as to be unsuitable in valve 100, metering cam 200 is designed to be replaced by partial dismantlement without removal of valve 100 from the process piping. Entry liner 140 and exit liner 160 remain suitable for continued service, and thus the downtime associated with changeover of metering cam 200 is minimized.

It will be apparent that in other embodiments, a metering cam may be provided that has more than two flow ports, e.g. a metering cam with three flow ports spaced at 120 degree intervals, or a metering cam with four flow ports spaced at 90 degree intervals. The size and locations of inner ports 149 and 169 of entry liner 140 and exit liner 160 would be selected in order to provide a pressure reducing valve with three or four different pressure reducing passageways therethrough, each of which could be put in service as needed during operation.

Referring again to FIG. 5 and FIGS. 7A–7D, in one embodiment of the applicant's pressure reducing valve 100, such pressure reducing valve is provided with a metering cam 200 comprised of a cylindrical body 205 of 1.75 inches in diameter. Flow ports 210 and 260 are formed by a cutting tool that is 0.375 inches in diameter, and that cuts into cylindrical body 205 at an angle of about 41 degrees, to a depth of about 0.375 inches. This metering cam 200 is fitted to a pressure reducing valve 100 comprising an entry liner 140 and an exit liner 160 having the dimensions are described previously herein; in particular, entry liner 140 has an inner port 149 of 0.75 inches in diameter, and exit liner 160 has an inner port 169 of 0.75 inches in diameter.

Figure 10:
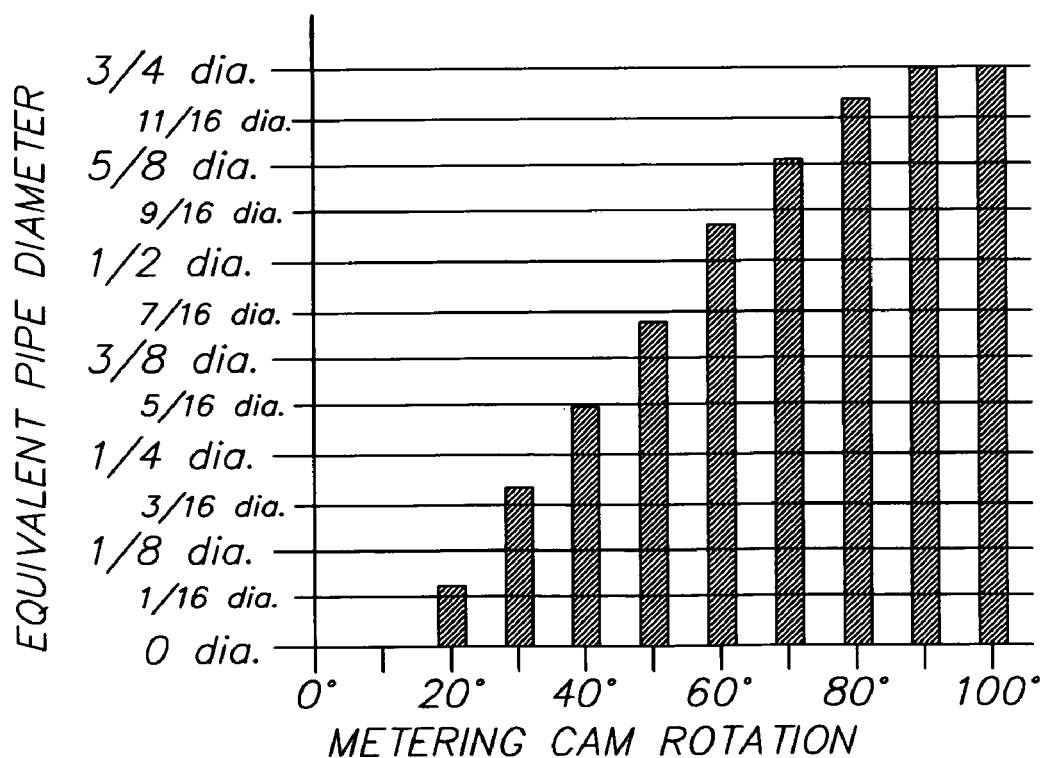
FIG. 10 is a bar graph which depicts the extent of opening of an entry orifice formed at the junction of the entry liner and the metering cam as a function of metering cam rotation in equivalent pipe diameter, for one embodiment of the applicant's pressure reducing assembly.

The resulting entry orifice opening and exit orifice openings of such a pressure reducing valve 100, with respect to angular position of the metering cam are shown in Table 1. It can be seen that entry orifice opening 230 varies from 0.000 square inches (i.e. closed) at 0 degrees, to 0.435 square inches at 100 degrees (full open); and that exit orifice opening 240 varies from 0.059 square inches at 0 degrees, to 0.440 square inches at 100 degrees (full open). FIG. 10 is a bar graph which depicts the extent of opening of entry orifice 230 in equivalent pipe diameter. It can be seen that as expected, entry orifice 230 is equivalent to a zero pipe diameter in the closed position of 0 degrees, a 0.75 inch pipe diameter in the full open position of 100 degrees, and equivalent pipe diameters between 0 and 0.75 inches at various intermediate operating positions, as indicated in FIG. 9.

Fluid flow analyses have been performed on the applicant's pressure reducing valve, as well as on other pressure reducing valves and metering devices for the sake of comparison of flow properties between them. COSMOS software sold by the SolidWorks Corporation of Concord, Mass. was used to analyze various aspects of fluid flow through these valves. The valves were first rendered as simple 3D models in SolidWorks, which are depicted in FIGS. 11A–11D.

Figure 11A:
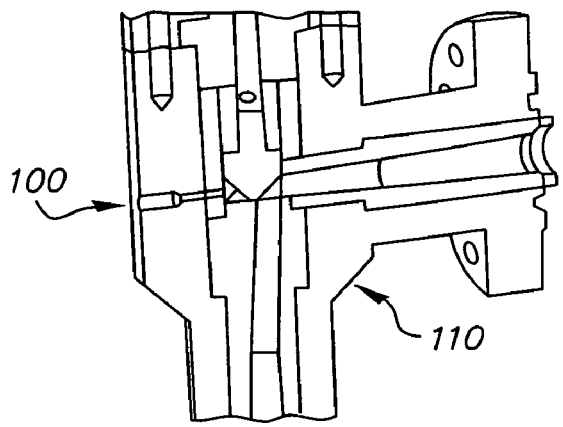
FIG. 11A is a cutaway perspective view of the applicant's pressure reducing valve taken from an angle that is slightly above and to the left of the orthogonal viewpoint of the side elevation view of FIG. 2.
Figure 11B:
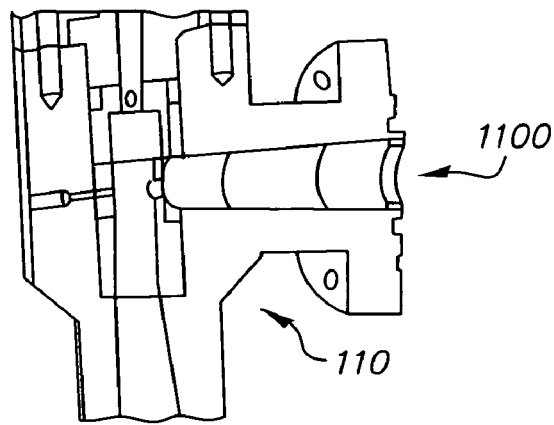
FIG. 11B is a similar cutaway perspective view of a valve comprising a plug with a flow orifice provided therethrough.
Figure 11C:
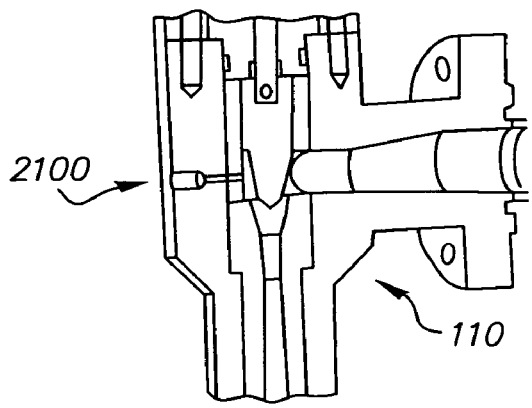
FIG. 11C is a similar cutaway perspective view of a valve comprising a cone-and-seat metering assembly.
Figure 11D:
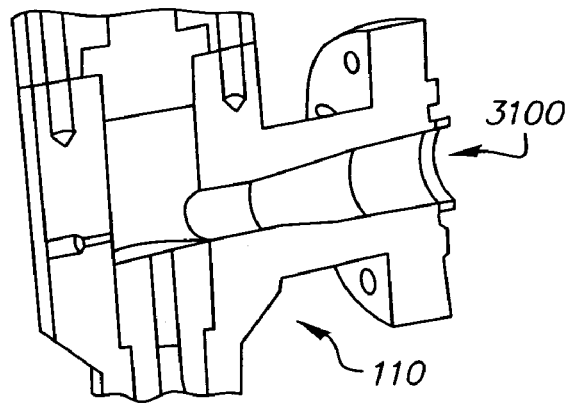
FIG. 11D is a similar cutaway perspective view of a pressure reducing assembly comprising an inlet cavity and a metering discharge orifice.

FIG. 11A is a cutaway perspective view of the applicant's pressure reducing valve taken from an angle that is slightly above and to the left of the orthogonal viewpoint of the side elevation view of FIG. 2. FIG. 11B is a similar cutaway perspective view of a valve comprising a plug with a flow orifice provided therethrough. FIG. 11C is a similar cutaway perspective view of a valve comprising a cone-and-seat metering assembly. FIG. 11D is a similar cutaway perspective view of a pressure reducing assembly comprising an inlet cavity and a metering discharge orifice. For the sake of simplicity of analysis, water was used as a surrogate fluid to give a qualitative indication of local flow velocities and the extent of turbulence within each valve. The applicant's pressure reducing valve 100 was provided having the dimensions as recited previously herein. The pressure reducing valves/assemblies 1100, 2100, and 3100 of FIGS. 11B, 11C, and 11D were provided with the same housing 110 as used in the applicant's valve 100, with the various internal components being proportioned as indicated.

FIGS. 12A–12D are flow trajectory plots across vertical cross-sections of the valve assemblies 100, 1100, 2100, and 3100 of FIGS. 11A–11D, respectively. To produce these plots, massless particles are introduced into the flow and the trajectory history of each particle is plotted along a streamline. In the plot of the flow in the applicant's valve 100 in FIG. 12A, the metering cam is positioned to provide an entry orifice opening of ⅜ of an inch in equivalent pipe diameter, i.e. 0.375 inch. This opening corresponds to a metering cam position of about 46 degrees (see FIG. 10). In all of the analyses, the flow rate of water through the valves was about 55 gallons per minute.

It can be seen that valve 1100 of FIG. 11B has considerable turbulence and abrupt velocity/directional changes 1199 in localized areas in the entire metering assembly thereof in like manner, pressure reducing assembly 3100 has turbulence and abrupt velocity changes immediately upstream of orifice 3110. Both of these valves would be expected to undergo adverse wear of their respective metering components due to this turbulence, and in the event of such wear, neither valve has the capability for adjustment of simple replacement of the metering components therein.

It can also be seen that pressure reducing valve 2100 also has some abrupt velocity/directional change in the vicinity of cone 2110, which is disposed above seat 2120. The extent of the velocity/directional changes are less than for the pressure reducing assemblies 1100 and 3100 of FIGS. 12B and 12D. However, wear would still be expected at cone 2110 and seat 2120 of pressure reducing valve 2100. In the event of such wear, valve 2100 has no provision for the replacement of the metering orifice therein, i.e., simple rotation of metering cone 2110 of valve 2100 does not provide a renewable metering orifice as in rotation of the metering cam 200 of the applicant's valve 100.

Figure 12A:
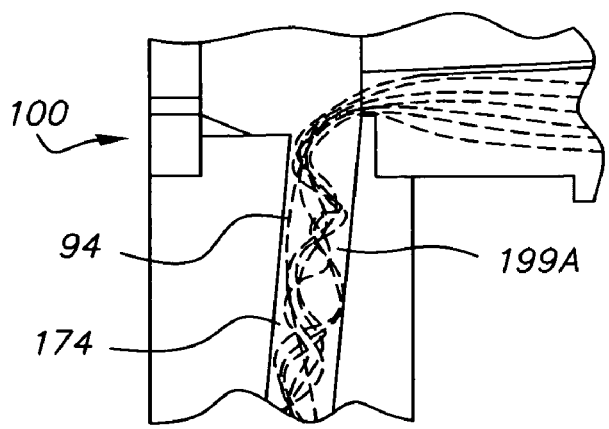
FIGS. 12A–12D are flow trajectory plots across vertical cross-sections of the valve assemblies of FIGS. 11A–11D, respectively at a first set of flow conditions.
Figure 12B:
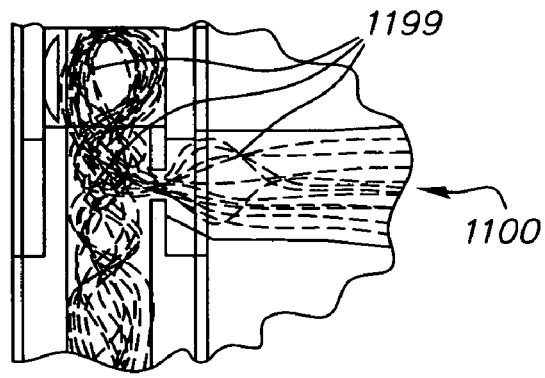
Figure 12C:
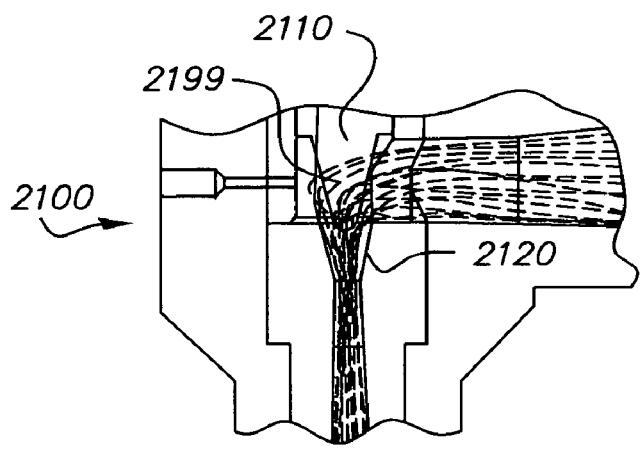
Figure 12D:
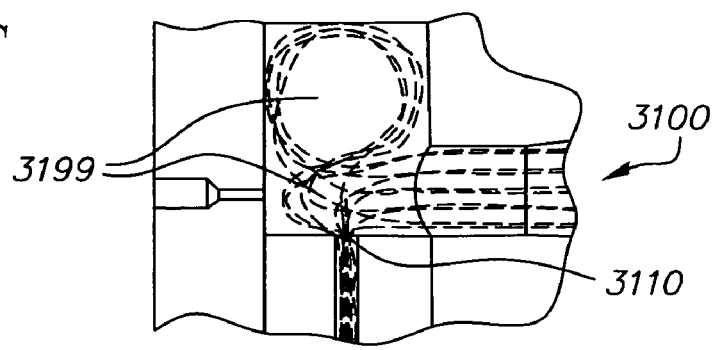
Figure 13A:
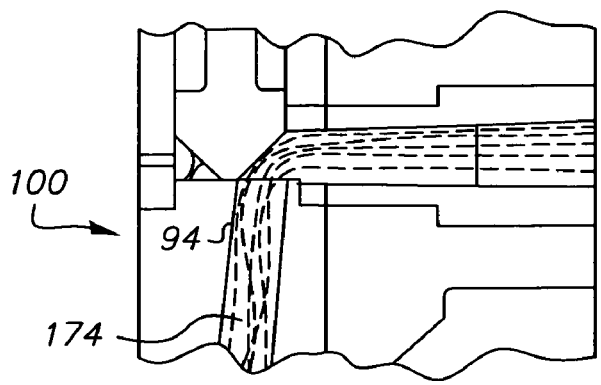
FIGS. 13A–13D are flow trajectory plots across vertical cross-sections of the valve assemblies of FIGS. 11A–11D, respectively at a second set of flow conditions.
Figure 13B:
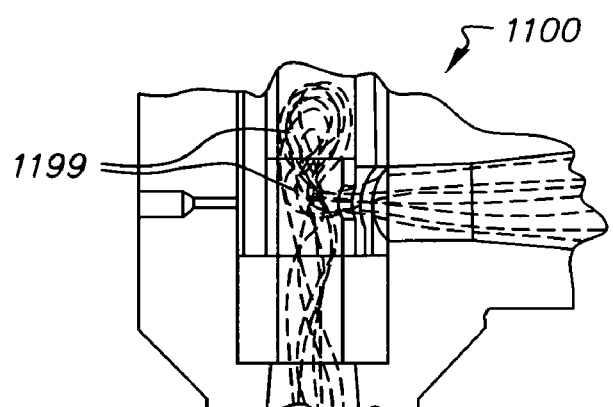
Figure 13C:
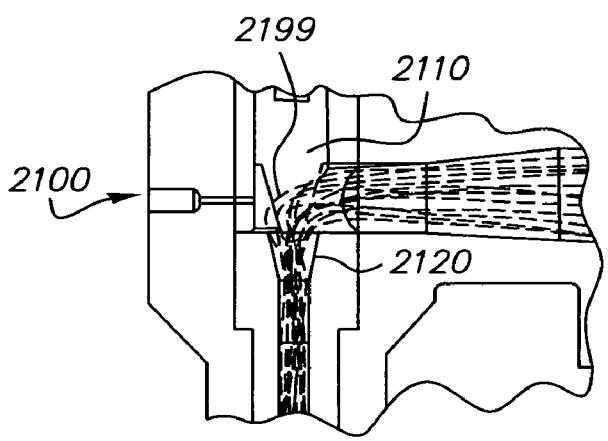
Figure 13D:
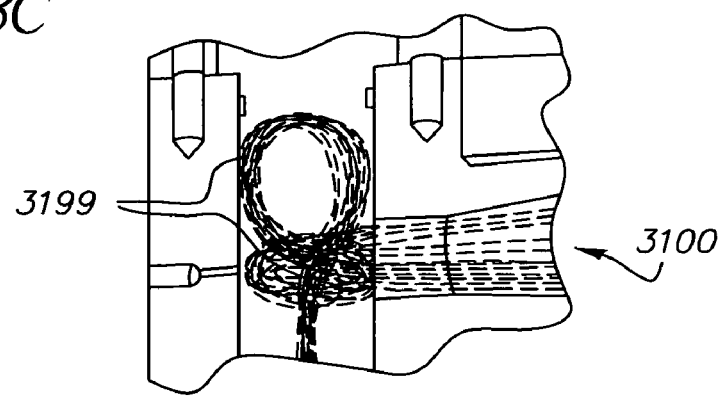

Finally, it can be seen in FIG. 12A that the flow through the metering assembly of the applicant's valve 100 is accomplished with a minimum of downstream turbulence 199A therein. A high velocity region 94 does occur in angled bore 174 near the wall of such bore, but since there is no highly abrupt change in the direction of the velocity in this region, entrained sand does not impinge on the wall of the bore to an extensive degree, and wear of the bore is minimized. It will be apparent that the overall flow characteristics of the applicant's pressure reducing valve are superior to other valve configurations.

FIGS. 13A–13D are flow trajectory plots across vertical cross-sections of the valve assemblies 100, 1100, 2100, and 3100 of FIGS. 11A–11D, respectively. In the plot of the flow in the applicant's valve 100 in FIG. 13A, the metering cam is positioned to provide an entry orifice opening of ⅝ of an inch in equivalent pipe diameter, i.e. 0.625 inch. This opening corresponds to a metering cam position of about 70 degrees (see FIG. 10). In all of the analyses, the flow rate of water through the valves was about 10 gallons per hour.

It can be seen that the results of the analyses are substantially the same as shown in FIGS. 12A–12D. It will again be apparent that the overall flow characteristics of the applicant's pressure reducing valve are superior to the configurations of valves 1100, 2100, and 3100.

Figure 14:
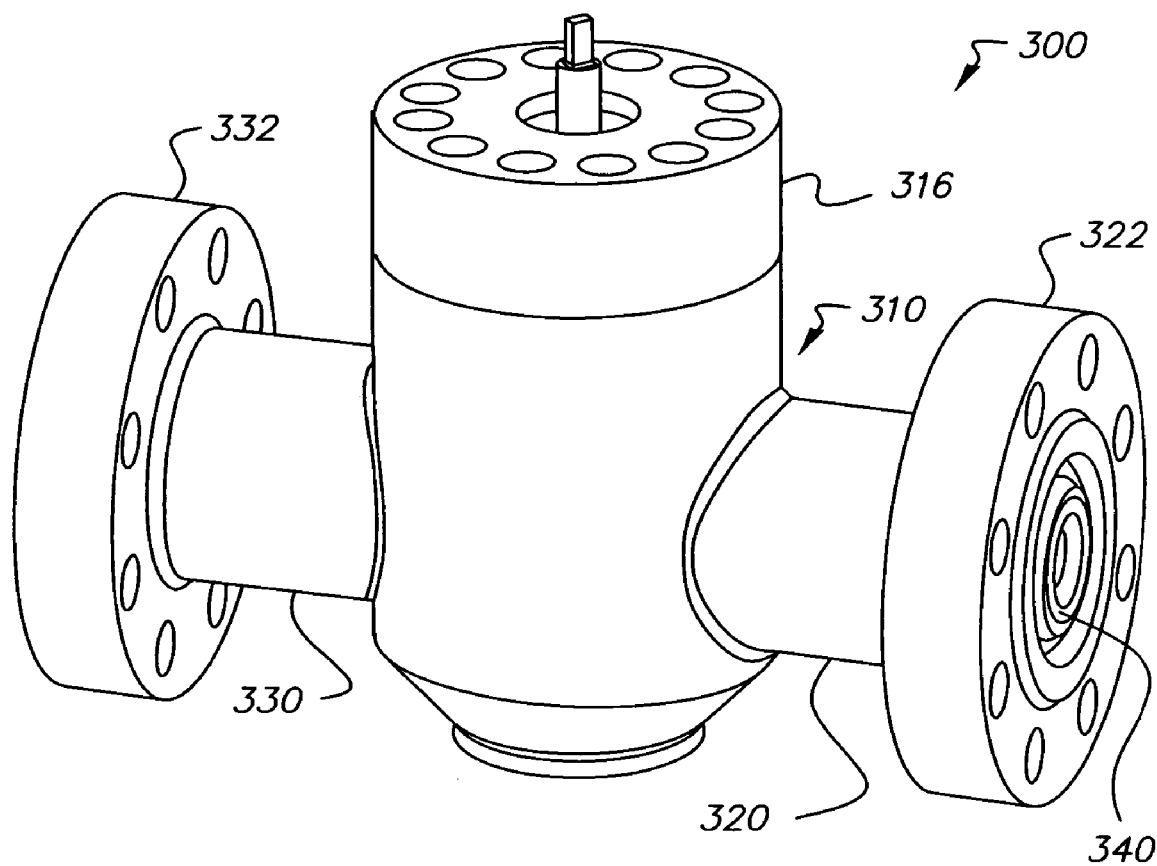
FIG. 14 is a is a perspective view of one straight through pressure reducing assembly of the present invention.
Figure 15:
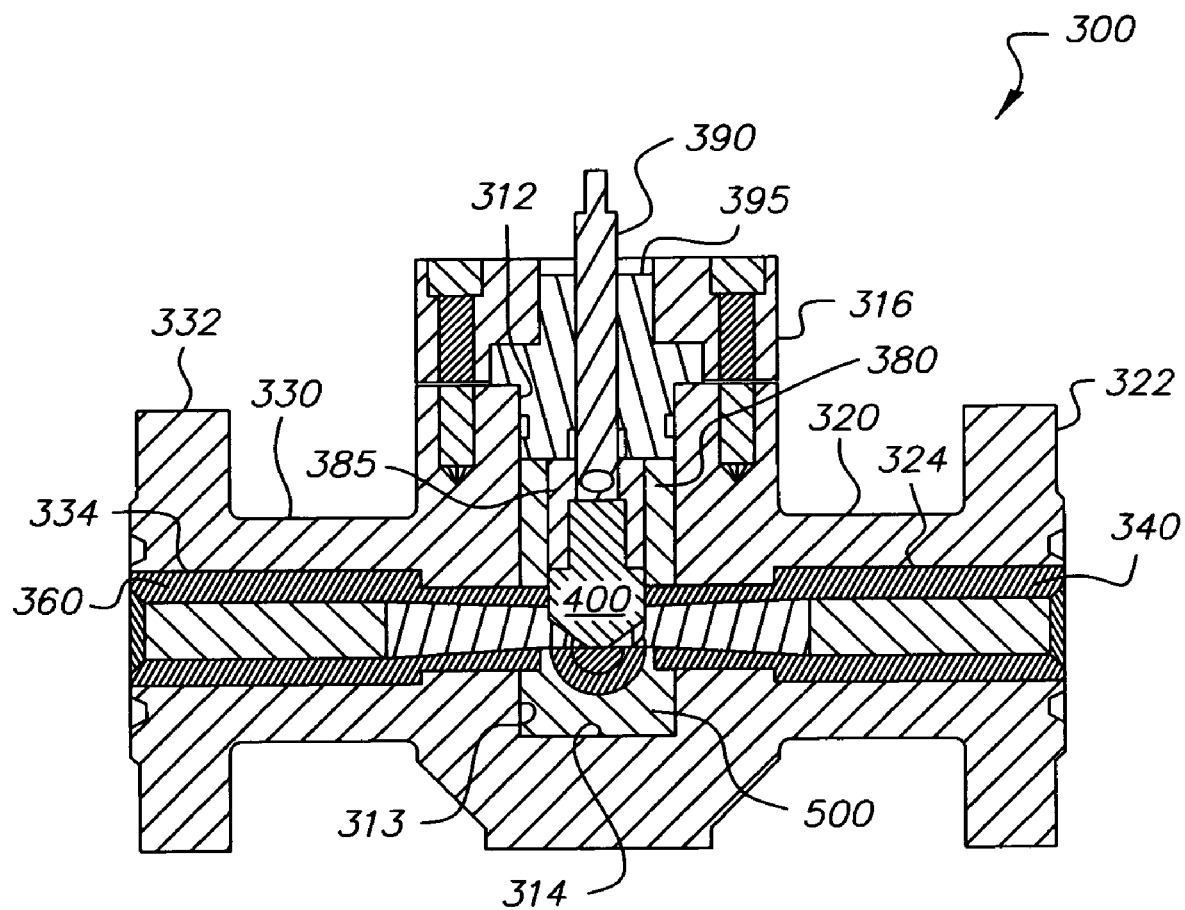
FIG. 15 is a side elevation cross-sectional view of the pressure reducing assembly of FIG. 14.
Figure 16:
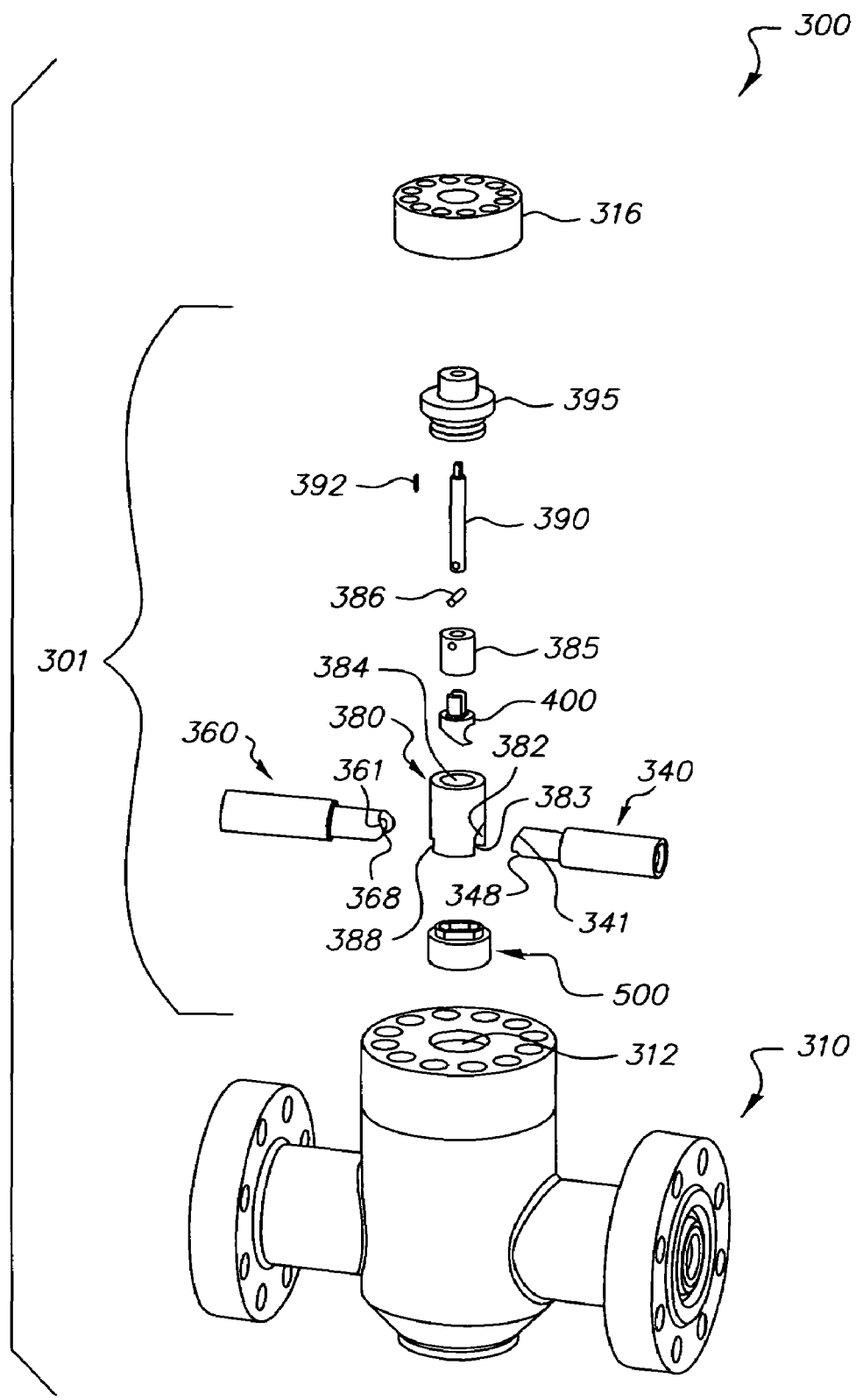
FIG. 16 is an exploded perspective view of the pressure reducing assembly of FIG. 14.

The applicant's pressure reducing valve assemblies are further provided in embodiments for which the inlet port and the outlet port are substantially 180 degrees opposite each other to provide an overall "straight through" flow pattern within such valve assemblies. FIG. 14 is a is a perspective view of one straight through pressure reducing assembly of the present invention; FIG. 15 is a side elevation cross-sectional view of the pressure reducing assembly of FIG. 14; and FIG. 16 is an exploded perspective view of the pressure reducing assembly of FIG. 14. Referring to FIGS. 14–16, it will be apparent that much of the structure of pressure reducing valve 300 is common with that of pressure reducing valve 100 shown in FIGS. 1–4 and described previously herein. Accordingly, certain details of valve 300 will be indicated as being substantially the same as valve 100, and not further described in detail.

Pressure reducing valve 300 is comprised of a hollow body 310 comprising an inlet or entry branch 320 that is substantially coaxial with outlet or exit branch 330, such that entry branch 320 and exit branch 330 and the liners 340 and 360 disposed therein are coaxial and define an angle of 180 degrees from branch 320 to branch 330. Branches 320 and 330 are provided with suitable provisions for connection to process piping, such as bolt flanges 322 and 332, respectively.

In the embodiment of valve 300 depicted in FIGS. 14–16, entry branch 320 and entry liner 340 are substantially identical to exit branch 330 and exit liner 360. Entry liner 340 and exit liner 360 are substantially identical to entry liner 140 of valve 100 shown in FIGS. 1–4 and previously described herein. Accordingly, the bores of entry branch 320 and exit branch 330 are substantially identical to the entry bore 124 of valve 100, and the respective fits of entry liner 340 and exit liner 360 in entry branch 320 and exit branch 330 are the same as entry liner 140 in entry branch 120 of valve 100.

Referring again to FIG. 15 and FIG. 16, pressure reducing valve assembly 300 comprises numerous additional components disposed within metering bore 312 of valve body 310, for the purpose of providing real-time adjustability of the pressure reduction provided by valve assembly 300, as is done for valve 100 of FIGS. 1–4. Such components include cupped base 500, body sleeve 380, metering cam 400, connector 385, pin 386, shaft 390, key 392, and shaft and seal guide 395; such components, together with entry liner 320 and exit liner 330 comprise an overall internal metering assembly 301 disposed within valve assembly 300.

Figure 17:
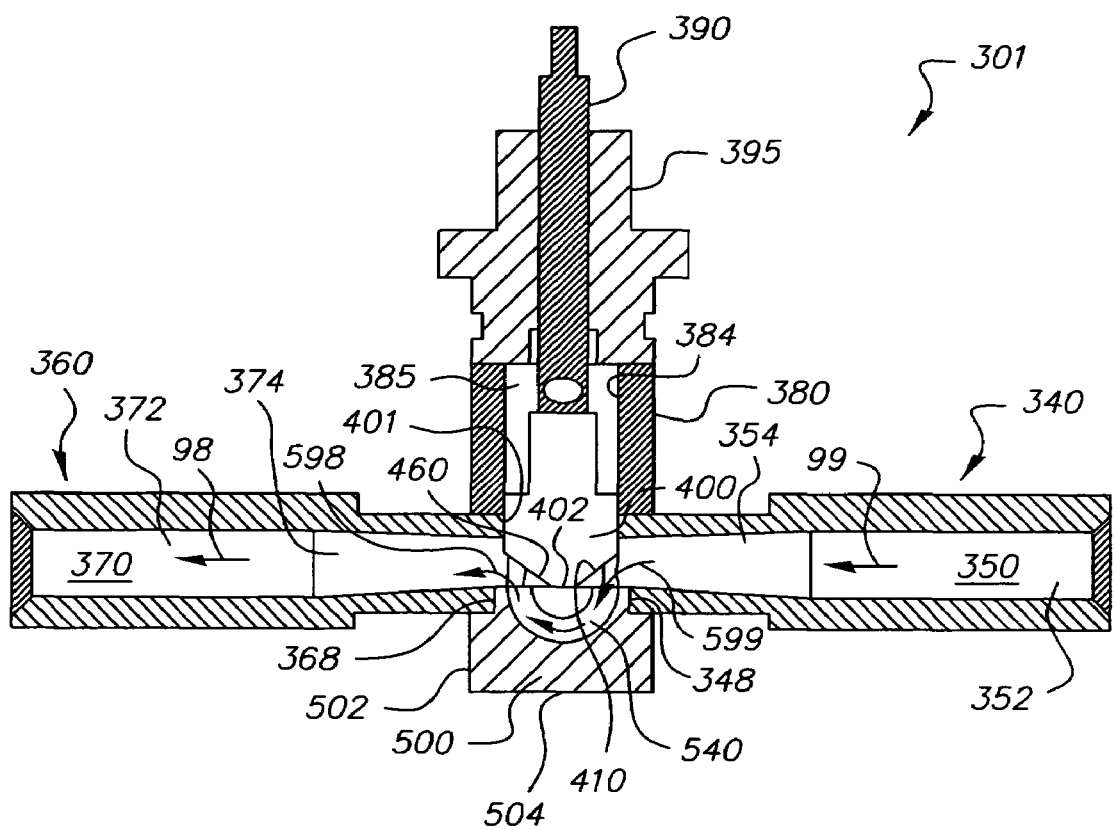
FIG. 17 is a cross-sectional side elevation view of metering assembly or the pressure reducing valve of FIGS. 14–16.

The spatial and cooperative relationships between the components of metering assembly 301, and the manner in which metering assembly 301 is assembled are best understood with reference also to FIG. 17, which is a cross-sectional side elevation view of metering assembly 301, viewed from the same vantage point as for FIG. 15; and FIGS. 18A–18D, which are a side view, a top view, a perspective view, and a cross-sectional perspective view, respectively, of the cupped base 500 of metering assembly 301.

Referring to FIGS. 15, 16, 17, and 18A–18D, cupped base 500 is comprised of a cylindrical body 502 that extends upwardly from flat bottom 504 to shoulder 510. Cupped base 500 further comprises a raised boss 520, the perimeter of which is dimensioned to engage and seal with recessed end portion 348 of inner end 341 of entry liner 340, recessed end portion 368 of inner end 361 exit liner 360, and flat crescent-shaped lower ends 381 and 383 of annular body sleeve 380. In the process of assembly of valve 300, cupped base 500 is disposed in metering bore 312 and pushed downwardly into the lower portion 313 of bore 312, until the flat bottom 504 of cupped base 500 is contiguous with and stopped by flat bottom 314 of bore 312 in body 310.

Annular body sleeve 380 is then fitted into metering bore 312, until the flat crescent-shaped lower ends 381 and 383 thereof are seated upon shoulder 510 of cupped base 500. Annular body sleeve 380 is aligned particularly such that the flat crescent-shaped lower ends 381 and 383 thereof rest upon crescent shaped regions 511 and 513 of shoulder 510. Accordingly, U-shaped openings 382 and 388 on annular body sleeve 380 are aligned with port regions 512 and 514 of shoulder 510. U-shaped opening 382, together with port region 512 of shoulder 510 of cupped base 500, forms a port opening for receiving end the inner end 341 of entry liner 340. In like manner, U-shaped opening 388, together with port region 514 of shoulder 510 of cupped base 500, forms a port opening for receiving end the inner end 361 of entry liner 360.

Entry liner 340 is thus inserted into the entry bore 324 of body 310 as was described for the fitting of entry liner 140 into entry bore 124 for valve 100 of FIGS. 1–4. Inner end 341 of entry liner 340 is precision machined so as to match and seal with the corresponding surfaces of U-shaped opening 382 of body sleeve 380 and port region 512 of shoulder 510 of cupped base 500, and to permit sliding contact with the vertical wall of metering cam 400 when metering cam 400 is rotated. In like manner, exit liner 360 is inserted into the exit bore 334 of body 310 as is done for the fitting of entry liner 360 into entry bore 324. Inner end 361 of entry liner 360 is likewise precision machined so as to match and seal with the corresponding surfaces of U-shaped opening 388 of body sleeve 380 and port region 514 of shoulder 510 of cupped base 500, and to permit sliding contact with the vertical wall of metering cam 400 when metering cam 400 is rotated.

Metering cam is 400 is disposed within the inner bore 384 of body sleeve 380, such that the flat base 402 of metering cam 400 is in contact with upper flat surface 530 of cupped base 500. In one preferred embodiment, metering cam 400 of metering assembly 301 is substantially the same as metering cam 200 shown in FIGS. 7A–7D and previously described herein. The vertical wall 401 of metering cam 400 is substantially cylindrical, and has a diameter with just sufficient clearance with inner bore 384 of body sleeve 380 such that metering cam is slidable and rotatable within bore 384. Metering cam 400 is operatively connected to shaft 390, such that rotation of shaft 390 by suitable rotational drive means (not shown) results in the rotation of metering cam 400. Metering cam 400 is provided with at least one flow port machined or otherwise formed therein, so that when metering cam 400 is placed in various rotational positions, various amounts of fluid flow and pressure reduction occur within valve assembly 300 in a manner similar to that described previously herein for valve 100 of FIGS. 1–4. In general, metering cam 400 is fitted within, and rotationally positioned in a manner that is substantially the same as for metering cam 200 of valve 100 of FIGS. 1–4.

Referring again to FIGS. 15–17, the selection of preferred materials for the components of metering assembly 301 of valve 300 is the same as that described for metering assembly 101 of valve 100 of FIGS. 1–4.

As was the case for the valve 100 shown in FIGS. 1–4 and previously described herein, the components of metering assembly 101 of pressure reducing valve 300 are provided with certain internal porting and flow geometry. Without wishing to be bound to any particular theory, applicant believes that the internal porting and flow geometry of the metering assembly 301 of his valve confines the most severe turbulence within the flow port 410 of metering cam 400, and also reduces overall flow turbulence within metering assembly 301. The applicant believes that such a confinement of turbulence causes the wear within metering assembly 301 that is due to the tendency of sand to be centrifugally displaced outwardly in flow eddies to occur to a greater degree within the flow port 410 of metering cam 400. The flow and pressure reduction within metering cam 400 is adjustable to compensate for such wear. Since such wear preferentially occurs in the upstream flow port 410 of metering cam 400 rather than downstream flow port 460, cam 400 is renewable at least once by rotation of the valve to put less worn flow port 460 in the upstream position, and more worn flow port 410 in the downstream position.

Referring again to FIG. 16 and FIGS. 18A–18D, cupped base 500 provides a cavity immediately beneath metering cam 400 in which the flow of fluid is redirected from angular downward direction indicated by arrow 599 to an angular upward direction indicated by arrow 598. Cavity or cup 540 is formed in cupped base 500 in the upper flat surface 530 of raised boss 520. In one preferred embodiment depicted in FIGS. 18A–18D, cup 540 is machined into base 500 using a ball-shaped cutting tool (not shown). Such a cutting tool is used to form a cup 540 comprised of an oblong shape, and including a pair of opposed flat walls 542 and 544, with semicircular ends 546 and 548.

Figure 18A:
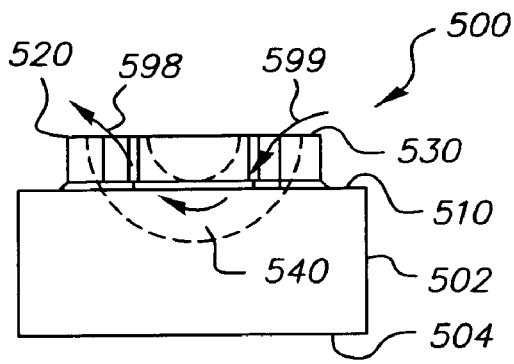
FIGS. 18A–18D are a side view, a top view, a perspective view, and a cross-sectional perspective view, respectively, of the cupped base of the metering assembly of FIG. 17.
Figure 18B:
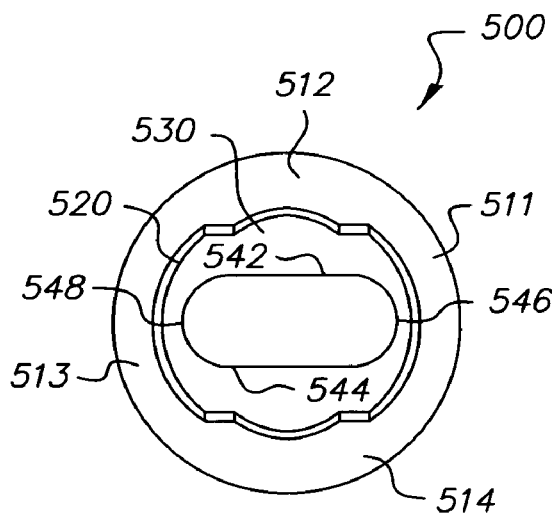
Figure 18C:
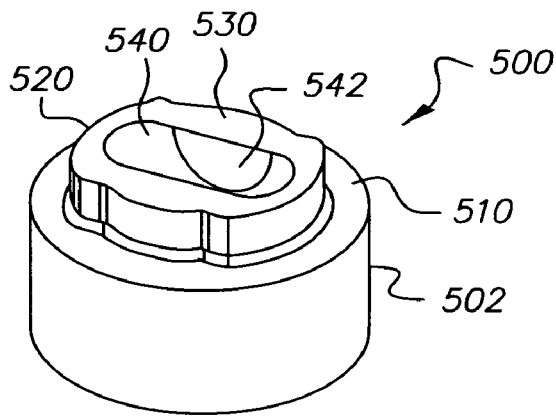
Figure 18D:
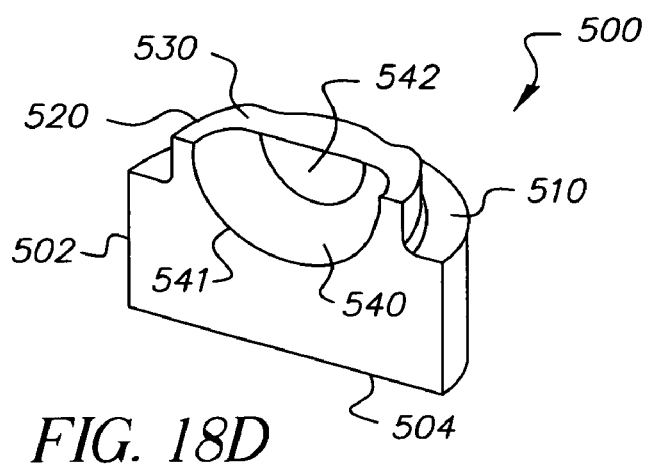

In the preferred embodiment, the path of the cutting tool is programmed to produce a semicircular cup 540, i.e. having a semicircular radius of curvature 541 in the horizontal plane shown in FIG. 18D. The radius of the cutting edge of the cutting tool is about 0.4 to about 0.45 times the overall semicircular radius of curvature 541 of cup 540; thus the semicircular ends 546 and 548 have the radius of the ball shaped cutting tool in the horizontal plane defined by upper surface 530. The resulting cup or cavity 540 may be considered as having a pair of opposed walls that are sectors of a circle, joined to the radially outward portion of an equal sector of a toroid. If the cutting tool machines out a full 180 degree sector, the resulting opposed walls 542 and 544 are semicircles that bound a half cylinder between them, and the radially outward portion cut by the edge of the ball cutting tool is a 180 degree sector of the outer portion of a toroid.

In a manner similar to that for metering valve 100 previously described herein and shown in detail in FIGS. 7A–10, flow orifices are produced at the junctures of inlet liner 340 and metering cam 400, metering cam 400 and cupped base 500, and metering cam 400 and outlet liner 360. In particular, and entry orifice opening is formed at the juncture of inlet liner 340 and metering cam 400 that is substantially the same as for entry orifice opening 230 shown in detail in FIG. 8 and previously described herein.

An exit orifice opening is likewise formed at the juncture of metering cam 400 and cupped base 500, where the fluid in metering assembly 301 is directed into the cup 540 as indicated by arrow 599. The shape of such exit orifice opening will be slightly different than exit orifice opening 240 depicted in FIG. 8 for previously described valve 100. For any given rotational position, such an exit orifice opening will be slightly larger than exit orifice opening 240, since the available flow area of the corresponding surface of cup 540 consists of a semicircular region bounded by edge 546 and a rectangular region bounded by walls 542 and 544, rather than a simple circular region as was the case for entry port 169 of exit liner 160 of valve 100.

Thus it will be apparent that for any rotational position of metering cam 400, the size of the entry orifice formed at the juncture of inlet liner 340 and metering cam 400 will be considerably smaller than the exit orifice formed at the juncture of metering cam 400 and upper flat surface 530 of cupped base 500. Applicant thus believes that the majority of the pressure reduction within valve 300 occurs in this flow region, in particular through the orifice formed at the inner end 341 of entry liner 340 and the flow port 410 of metering cam 400. As was previously described for the pressure reducing valve 100 of FIGS. 1–4, this structure results in the majority of wear within valve 300 occurring within flow port 410 of metering cam 400.

Valve 300 further comprises a second pair of flow orifices formed at the juncture of upper flat surface 530 of cupped base 500 and metering cam 400, and at the juncture of metering cam 400 and exit liner 360. In the embodiment of pressure reducing valve 300 depicted in FIGS. 14–18D, entry liners 340 and 360 are substantially identical, flow ports 410 and 460 of metering cam 400 are substantially identical, and cup 540 of cupped base 500 is symmetric with respect to a vertical plane that is perpendicular to the vertical plane shown in FIG. 18D. Thus the flow of fluid from cup 540 to exit liner 360 first passes through a large orifice into flow port 460 of metering cam 400, and then passes through a smaller orifice from flow port 460 into exit liner 360. Since the major share of pressure reduction has already occurred upstream, this situation does not produce excessive wear within metering assembly 301.

In an alternative embodiment (not shown), metering assembly 301 may be provided with a cupped base 500 and exit liner 360 that are formed to provide a series of downstream orifices that are the same in size or increasing in size in the direction of flow.

In a manner similar to that previously described for valve 100 of FIGS. 1–4 and described with reference to FIGS. 11A–13D, fluid flow analyses have been performed on the applicant's pressure reducing valve of FIGS. 14–18D, as well as on another 180 degree pressure reducing valve for the sake of comparison of flow properties between them. COSMOS software sold by the SolidWorks Corporation of Concord, Mass. was used to analyze various aspects of fluid flow through these valves. The valves were first rendered as simple 3D models in SolidWorks, which are depicted in FIGS. 19A and 19B.

Figure 19A:
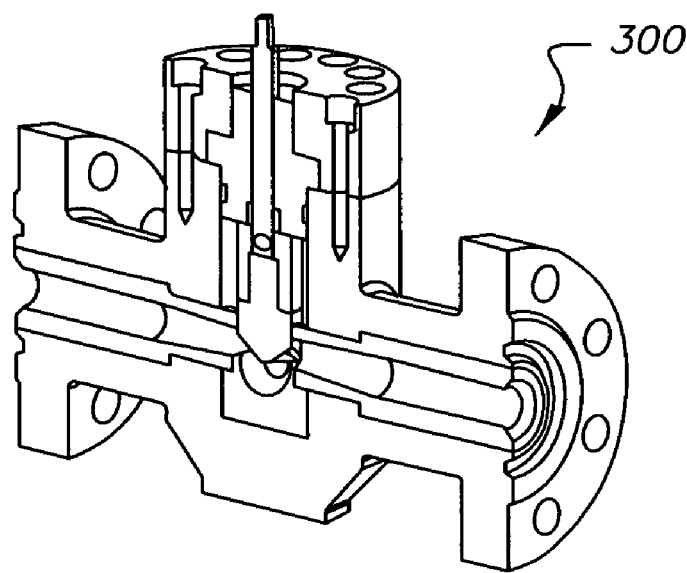
FIG. 19A is a cutaway perspective view of the applicant's 180 degree pressure reducing valve taken from an angle that is similar to the orthogonal viewpoint of FIG. 14.

FIG. 19A is a cutaway perspective view of the applicant's 180 degree pressure reducing valve taken from an angle that is similar to the orthogonal viewpoint of FIG. 14. FIG. 19B is a similar cutaway perspective view of a valve comprising a cylindrical shell with an inlet flow orifice 1312 provided therethrough. For the sake of simplicity of analysis, water was used as a surrogate fluid to give a qualitative indication of local flow velocities and the extent of turbulence within each valve. The applicant's pressure reducing valve 300 was provided having dimensions similar to those recited for valve 100 as recited previously herein, and pressure reducing valve 1300, which is a general standard design for prior art "inline" valves, was provided with comparable overall size and porting dimensions in order to process fluid at the same pressure and flow rate conditions.

Figure 19B:
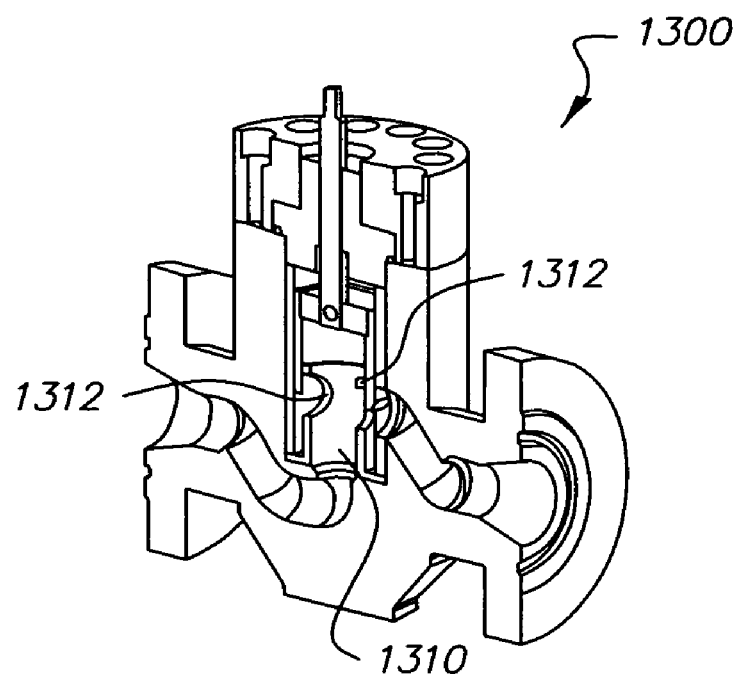
FIG. 19B is a similar cutaway perspective view of a valve comprising a cylindrical shell with an inlet flow orifice provided therethrough.
Figure 20A:
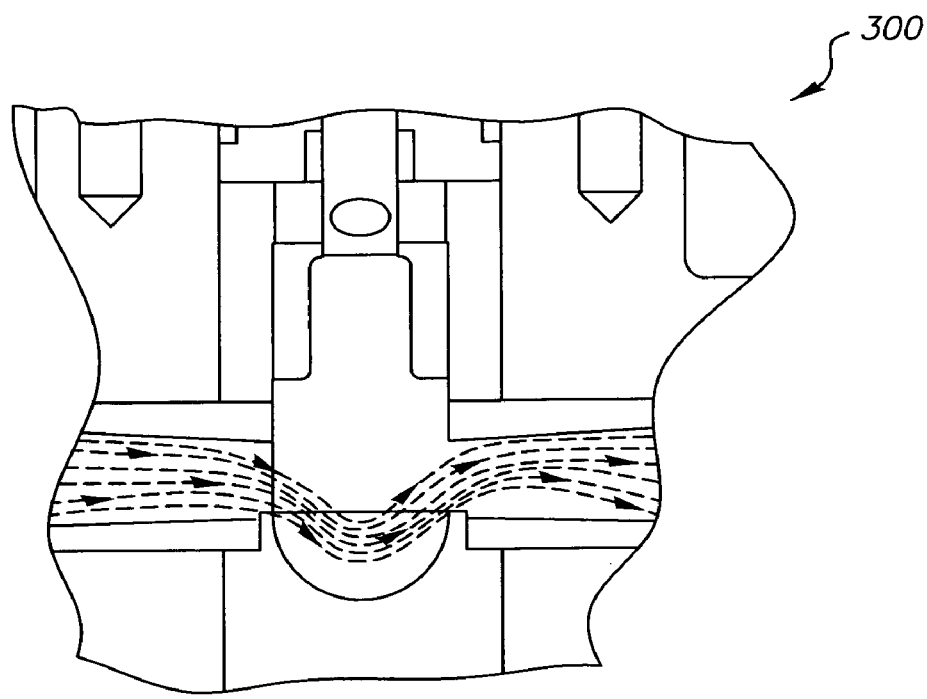
FIG. 20A is a flow trajectory plots across a vertical cross-sections of the valve assembly of FIG. 19A.
Figure 20B:
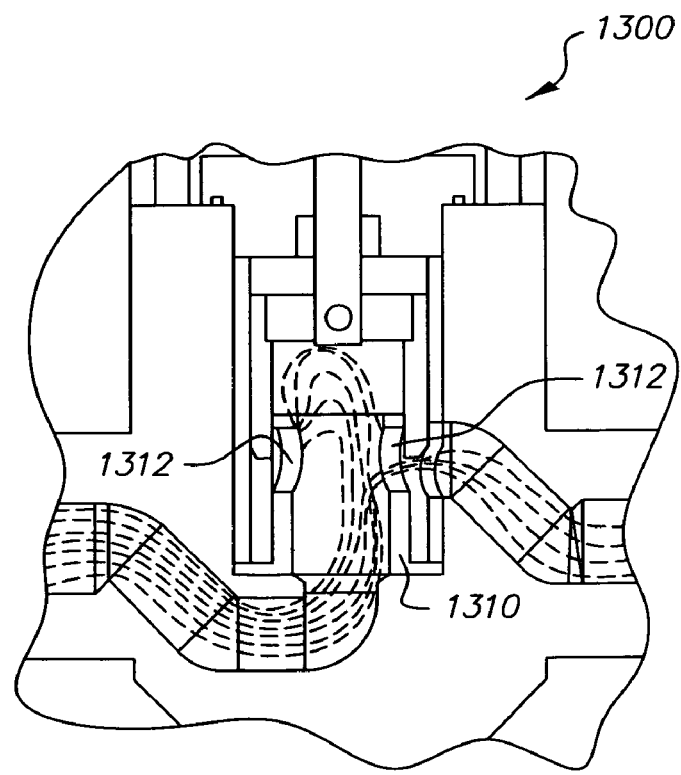
FIG. 20B is a flow trajectory plots across a vertical cross-sections of the valve assembly of FIG. 19B.

FIGS. 20A and 20B are flow trajectory plots across vertical cross-sections of the valve assemblies 300, and 1300 of FIGS. 19A and 19B, respectively. In the plot of the flow in the applicant's valve 300 in FIG. 12A, the metering cam is positioned at about 60 degrees. In all of the analyses, the flow rate of water through the valves was about 55 gallons per minute.

It can be seen that valve 1300 of FIG. 20B has considerable turbulence and abrupt velocity/directional changes in localized areas within the cylindrical shell 1310 and orifices 1312 thereof. In contrast, it can be seen in FIG. 20A that the flow through the metering assembly of the applicant's valve 300 is accomplished with a minimum of turbulence therein. It will be apparent that that of valve 1300.

It is, therefore, apparent that there has been provided, in accordance with the present invention, a pressure reducing valve assembly for a high pressure oil well comprised of a hollow housing and a metering assembly disposed within such housing, such metering assembly comprising an entry liner having an entry bore, an exit liner having an exit bore, and a rotatable metering cam comprising at least one metering port that connects the entry bore to the exit bore. The metering port forms adjustable orifices with the entry bore and the exit bore, and effects the reduction of pressure within the metering assembly, thereby providing a variable choke of the fluid flow therein. The metering port is adjustable, and preferably replaceable with at least a second metering port by with a simple rotation of the metering cam. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A pressure reducing valve assembly comprising:
   a. a hollow body comprised of a central section, an entry branch, an exit branch, and a metering cavity disposed in said central section;
   b. an entry liner disposed in an axial bore in said entry branch, said axial bore of said entry liner comprising an entry port at an inner end of said entry liner;
   c. an exit liner disposed in an axial bore in said exit branch, said axial bore of said exit liner comprising an exit port at an inner end of said exit liner;
   d. a rotatably positionable metering cam disposed in said metering cavity of said hollow body, said metering cam comprising a cylindrical body with a flat base and at least a first flow port formed in said cylindrical body of said metering cam;
   e. an inlet orifice into said first flow port of said metering cam formed at a juncture between said cylindrical body of said metering cam and said entry port at said inner end of said entry liner; and
   f. an outlet orifice out of said first flow port of said metering cam formed at a juncture between said flat base of said metering cam and a flat surface in contact with said flat base, said flat surface comprising an exit port.

2. The pressure reducing valve assembly as recited in claim 1, wherein said rotatably positionable metering cam is rotatably positionable between a fully closed position and a fully open position, and wherein the size of said inlet orifice is less than the size of said outlet orifice at all rotatably determined positions except said fully open position.

3. The pressure reducing valve assembly as recited in claim 2, wherein said metering cam is rotatable through an angular displacement of at least about 90 degrees.

4. The pressure reducing valve assembly as recited in claim 3, wherein said metering earn comprises a second flow port formed in said body of said metering cam.

5. A pressure reducing valve assembly comprising:
   a. a hollow body comprised of a central section, an entry branch, an exit branch, and a metering cavity disposed in said central section;
   b. an entry liner disposed in an axial bore in said entry branch, said axial bore of said entry liner comprising an entry port at an inner end of said entry liner;
   c. an exit liner disposed in an axial bore in said exit branch, said axial bore of said exit liner comprising an exit port at an inner end of said exit liner;
   d. a rotatably positionable metering cam disposed in said metering cavity of said hollow body, said metering cam comprising a cylindrical body with a flat base and at least a first flow port formed in said cylindrical body of said metering cam;
   e. an inlet orifice into said first flow port of said metering cam formed at a juncture between said cylindrical body of said metering cam and said entry port at said inner end of said entry liner; and
   f. an outlet orifice out of said first flow port of said metering cam formed at a juncture between said flat base or said metering cam and a flat surface in contact with said flat base, said flat surface comprising an exit port, wherein:
      1. said rotatably positionable metering cam is rotatably positionable between a fully closed position and a fully open position, and wherein the size of said inlet orifice is less than the size of said outlet orifice at all rotatably determined positions except said fully open position;
      2. said metering cam is rotatable through an angular displacement of at least about 90 degrees:
      3. said metering cam comprises a second flow port formed in said body of said metering cam; and
      4. said first flow port of said metering cam and said second flow port of said metering cam are mirror images of each other, and are formed in said cylindrical body of said metering cam in locations that are about 180 degrees opposite of each other.

6. The pressure reducing valve assembly as recited in claim 5, wherein said metering cam is rotatable through an angular displacement of at least about 180 degrees.

7. The pressure reducing valve assembly as recited in claim 5, wherein said first flow port and said second flow port of said metering cam comprise cylindrical cavities in said cylindrical body of said metering cam disposed at an acute angle with respect to the rotational axis of said metering cam.

8. The pressure reducing valve assembly as recited in claim 2, wherein said exit branch of said hollow body is substantially perpendicular to said entry branch of said hollow body, and said flat surface in said contact with said flat base of said metering cam comprises said inner end of said exit liner, and said exit port which comprises said flat surface is said exit port at said inner end of said exit liner.

9. A pressure reducing valve assembly comprising:
  a. a hollow body comprised of a central section an entry branch, an exit branch, and a metering cavity disposed in said central section;
  b. an entry liner disposed in an axial bore in said entry branch, said axial bore of said entry liner comprising an entry port at an inner end of said entry liner;
  c. an exit liner disposed in an axial bore in said exit branch, said axial bore of said exit liner comprising an exit port at an inner end of said exit liner;
  d. a rotatably positionable metering cam disposed in said metering cavity of said hollow body, said metering cam comprising a cylindrical body with a flat base and at least a first flow port formed in said cylindrical body of said metering cam;
  e. an inlet orifice into said first flow port of said metering cam formed at a juncture between said cylindrical body of said metering cam and said entry port at said inner end of said entry liner; and
  f. an outlet orifice out of said first flow port of said metering cam formed at a juncture between said flat base of said metering cam and a flat surface in contact with said flat base, said flat surface comprising an exit port, wherein:
    1. said rotatably positionable metering cam is rotatably positionable between a fully closed position and a fully open position, and wherein the size of said inlet orifice is less than the size of said outlet orifice at all rotatably determined positions except said fully open position;
    2. said exit branch of said hollow body is substantially perpendicular to said entry branch of said hollow body, and said flat surface in said contact with said flat base of said metering cam comprises said inner end of said exit liner, and said exit port which comprises said flat surface is said exit port at said inner end of said exit liner and
    3. said exit liner comprises an angled bore disposed in an inner section connected to an expanding tapered bore in an outer section.

10. The pressure reducing valve assembly as recited in claim 9, wherein said metering cam is disposed within a body sleeve, said body sleeve comprising a U-shaped opening in contact with said inner end of said exit liner to form a port for receiving said inner end or said entry liner.

11. A pressure reducing valve assembly comprising:
  a. a hollow body comprised of a central section, an entry branch, an exit branch, and a metering cavity disposed in said central section;
  b. an entry liner disposed in an axial bore in said entry branch, said axial bore of said entry liner comprising an entry port at an inner end of said entry liner;
  c. an exit liner disposed in an axial bore in said exit branch, said axial bore of said exit liner comprising an exit port at an inner end of said exit liner;
  d. a rotatably positionable metering cam disposed in said metering cavity of said hollow body, said metering cam comprising a cylindrical body with a flat base and at least a first flow port formed in said cylindrical body of said metering cam;
  e. an inlet orifice into said first flow port of said metering cam formed at a juncture between said cylindrical body of said metering cam and said entry port at said inner end of said entry liner; and
  f. an outlet orifice out of said first flow port of said metering cam formed at a juncture between said flat base of said metering cam and a flat surface in contact with said flat base, said flat surface comprising an exit port, wherein:
    1. said rotatably positionable metering cam is rotatably positionable between a fully closed position and a fully open position, and wherein the size of said inlet orifice is less than the size of said outlet orifice at all rotatably determined positions except said fully open position; and
    2. said exit branch of said hollow body is substantially coaxial with said entry branch of said hollow body, and said flat surface in said contact with said flat base of said metering cam is comprised of a flat upper surface of a cupped base, said cupped base being disposed in a lower portion of said metering cavity of said hollow body.

12. The pressure reducing valve assembly as recited in claim 11, wherein said cupped base is comprised of a cylindrical body joined to a raised boss rising upwardly from a shoulder and ending at said flat upper surface, and a cup formed in said flat upper surface, said cup providing a fluid flow path from said inlet liner of said valve assembly to said outlet liner of said valve assembly.

13. The pressure reducing valve assembly as recited in claim 12, wherein said metering cam is disposed within a body sleeve, said body sleeve comprising a first U-shaped opening in contact with said shoulder of said cupped base to form a first port for receiving said inner end of said entry liner, and a second U-shaped opening in contact with said shoulder of said cupped base to form a second port for receiving said inner end of said entry liner.

14. The pressure reducing valve assembly as recited in claim 12, wherein said cup comprises an oblong cavity comprised of opposed vertical flat walls joined to the radially outer portion of a sector of a toroid.

15. A pressure reducing valve assembly comprising:
  a. a hollow body comprised of a central section, an entry branch, an exit branch, and a metering cavity disposed in said central section;
  b. an entry liner disposed in an axial bore in said entry branch, said axial bore of said entry liner comprising an entry port at an inner end of said entry liner;
  c. an exit liner disposed in an axial bore in said exit branch, said axial bore of said exit liner comprising an exit port at an inner end of said exit liner;
  d. a rotatably positionable metering cam disposed in said metering cavity of said hollow body, said metering cam comprising a cylindrical body with a flat base and at least a first flow port formed in said cylindrical body of said metering cam;
  e. an inlet orifice into said first flow port of said metering cam formed at a juncture between said cylindrical body of said metering cam and said entry port at said inner end of said entry liner; and f. an outlet orifice out of said first flow port of said metering cam formed at a juncture between said flat base of said metering cam and a flat surface in contact with said flat base, said flat surface comprising an exit port; and g. The pressure reducing valve assembly as recited in claim 1, wherein said entry liner, said exit liner, and said metering cam consist essentially of a material selected from the group consisting of aluminum oxide ceramic, chromium oxide ceramic, high alumina ceramic, titanium oxide ceramic, zirconium oxide ceramic, silicon nitride ceramic, silicon carbide ceramic, tungsten carbide ceramic, quartz, metal alloys, and combinations thereof.

16. The pressure reducing valve assembly as recited in claim 15, wherein said material is a zirconium oxide ceramic, and wherein said zirconium oxide ceramic is selected from the group consisting of fully stabilized zirconia ceramic, magnesium partially stabilized zirconia ceramic, and yttria partially stabilized zirconia ceramic.

17. A pressure reducing valve assembly comprising:

a. a hollow body comprised of a central section, an entry branch substantially perpendicular to an exit branch, and a metering cavity disposed in said central section;

b. an entry liner disposed in an axial bore in said entry branch, said axial bore of said entry liner comprising an entry port at an inner end of said entry liner;

c. an exit liner disposed in an axial bore in said exit branch, said axial bore of said exit liner comprising an exit port at an inner end of said exit liner;

d. a rotatably positionable metering cam disposed in said metering cavity of said hollow body, said metering cam comprising a cylindrical body with a flat base and at least a first flow port formed in said cylindrical body of said metering cam;

e. an inlet orifice into said first flow port of said metering cam formed at a juncture between said cylindrical body of said metering cam and said entry port at said inner end of said entry liner; and f. an outlet orifice out of said first flow port of said metering cam formed at a juncture between said flat base of said metering cam and said inner end of said exit liner.

18. The pressure reducing valve assembly as recited in claim 17, wherein said rotatably positionable metering cam is rotatably positionable between a fully closed position and a fully open position, and wherein the size of said inlet orifice is less than the size of said outlet orifice at all rotatably determined positions except said fully open position.

19. A pressure reducing valve assembly comprising:

a. a hollow body comprised of a central section, an entry branch substantially coaxial with an exit branch, and a metering cavity disposed in said central section;

b. an entry liner disposed in an axial bore in said entry branch, said axial bore of said entry liner comprising an entry port at an inner end of said entry liner;

c. an exit liner disposed in an axial bore in said exit branch, said axial bore of said exit liner comprising an exit port at an inner end of said exit liner;

d. a rotatably positionable metering cam disposed in said metering cavity of said hollow body, said metering cam comprising a cylindrical body with a flat base and first and second flow ports formed in said cylindrical body of said metering cam;

e. a cupped base comprised of a cylindrical body joined to a raised boss rising upwardly from a shoulder and ending at said flat upper surface, and a cup formed in said flat upper surface;

f. an inlet orifice into said first flow port of said metering cam formed at a juncture between said cylindrical body of said metering cam and said entry port at said inner end of said entry liner; and g. an outlet orifice out of said first flow port of said metering cam formed at a juncture between said flat base of said metering cam and said flat upper surface of said cupped base.

20. The pressure reducing valve assembly as recited in claim 19, wherein said rotatably positionable metering cam is rotatably positionable between a fully closed position and a fully open position, and wherein the size of said inlet orifice is less than the size of said outlet orifice at all rotatably determined positions except said fully open position.

\* \* \* \* \*